US012470796B2

(12) United States Patent
Liang et al.

(10) Patent No.: US 12,470,796 B2
(45) Date of Patent: Nov. 11, 2025

(54) CAMERA MODULE WITH ANNULAR LIGHT GUIDE MEMBER AND MOBILE TERMINAL

(71) Applicant: GUANGDONG OPPO MOBILE TELECOMMUNICATIONS CORP., LTD., Guangdong (CN)

(72) Inventors: Jiajun Liang, Guangdong (CN); Yi Wei, Guangdong (CN); Mozhou Lin, Guangdong (CN); Aixiang Yu, Guangdong (CN); Baicheng Zhang, Guangdong (CN); Jiyan Wu, Guangdong (CN); Yong Qin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 264 days.

(21) Appl. No.: 18/050,978

(22) Filed: Oct. 28, 2022

(65) Prior Publication Data
US 2023/0075148 A1 Mar. 9, 2023

Related U.S. Application Data

(63) Continuation of application No. PCT/CN2021/095245, filed on May 21, 2021.

(30) Foreign Application Priority Data

May 26, 2020 (CN) .......................... 202010456110.4
May 26, 2020 (CN) .......................... 202020905913.9
(Continued)

(51) Int. Cl.
*H04N 23/56* (2023.01)
*H04M 1/02* (2006.01)
(Continued)

(52) U.S. Cl.
CPC .......... *H04N 23/56* (2023.01); *H04M 1/0264* (2013.01); *H04N 23/51* (2023.01); *H04N 23/55* (2023.01)

(58) Field of Classification Search
CPC ........ H04N 23/56; H04N 23/51; H04N 23/55; H04N 23/57; H04M 1/0264; G03B 15/05
See application file for complete search history.

(56) References Cited

U.S. PATENT DOCUMENTS 6,430,371 B1 * 8/2002 Cho ....................... G03B 15/03
 396/176
9,823,411 B2 * 11/2017 Holman ................ G02B 6/0061
(Continued)

FOREIGN PATENT DOCUMENTS

CN 1834769 9/2006
CN 203673203 6/2014
(Continued)

OTHER PUBLICATIONS

EPO, Extended European Search Report for EP Application No. 21813974.9, Sep. 8, 2023.
(Continued)

Primary Examiner — Chiawei Chen
(74) Attorney, Agent, or Firm — Hodgson Russ LLP

(57) ABSTRACT

A camera module and a mobile terminal are provided. The camera module includes a lens assembly, a light guide member and a light source, the light guide member is of an annular structure, and the light guide member is sleeved on an outer peripheral side of the lens assembly; and light emitted from the light source is incident in the light guide member through the outer peripheral side of the light guide member and is emitted out through a light emitting surface of the light guide member, and the light emitting surface faces toward an object side of the lens assembly. The camera
(Continued)

module and the mobile terminal have sufficient and uniform illumination supplementation.

17 Claims, 14 Drawing Sheets

(30) Foreign Application Priority Data

Mar. 10, 2021 (CN) .......................... 202110260231.6
Mar. 10, 2021 (CN) .......................... 202110261137.2

(51) Int. Cl.
   *H04N 23/51* (2023.01)
   *H04N 23/55* (2023.01)

(56) References Cited

U.S. PATENT DOCUMENTS

| | | | |
|---|---|---|---|
| 10,136,803 | B1* | 11/2018 | Griffin ................... H04N 23/74 |
| 10,405,752 | B2* | 9/2019 | Khosravi Simchi ........................ A61B 5/6898 |
| 11,099,127 | B2* | 8/2021 | Amamiya ............. G01N 33/025 |
| 2006/0083508 | A1* | 4/2006 | Tenmyo ............... G02B 6/0001 396/175 |
| 2009/0109538 | A1* | 4/2009 | Kitayama ............. C08F 283/12 524/502 |
| 2009/0114280 | A1 | 5/2009 | Jensen et al. |
| 2014/0219646 | A1* | 8/2014 | Hooton ................... G03B 15/03 396/176 |
| 2016/0245954 | A1* | 8/2016 | Ge ........................... C08L 33/14 |
| 2016/0266439 | A1* | 9/2016 | Li ..................... G02F 1/133603 |
| 2017/0131620 | A1* | 5/2017 | Nakahara ............... G02B 6/001 |
| 2018/0210323 | A1* | 7/2018 | Ahn .................... G02B 21/0008 |
| 2018/0332198 | A1* | 11/2018 | Machii ................... H05K 1/148 |
| 2019/0003963 | A1* | 1/2019 | Amamiya ............. G01N 33/025 |
| 2019/0033688 | A1* | 1/2019 | Kakkar ................... G03B 30/00 |
| 2019/0064526 | A1* | 2/2019 | Connor ................ G02B 6/0073 |
| 2019/0265576 | A1* | 8/2019 | Lin ........................ G03B 15/05 |
| 2021/0311374 | A1* | 10/2021 | Xiao ..................... G03B 15/05 |
| 2021/0409527 | A1* | 12/2021 | Li ......................... G06F 1/1686 |
| 2022/0014655 | A1* | 1/2022 | Hu ......................... H04N 23/51 |

FOREIGN PATENT DOCUMENTS

| | | | | |
|---|---|---|---|---|
| CN | 102822739 | | 2/2015 | |
| CN | 106568068 | | 4/2017 | |
| CN | 106681082 | | 5/2017 | |
| CN | 206178314 | | 5/2017 | |
| CN | 206178323 | | 5/2017 | |
| CN | 107483799 | | 12/2017 | |
| CN | 207117767 | | 3/2018 | |
| CN | 110515258 | | 11/2019 | |
| CN | 110708456 | | 1/2020 | |
| CN | 110753144 | | 2/2020 | |
| CN | 110769161 | | 2/2020 | |
| CN | 210225469 | U * | 3/2020 | ........... G06F 1/1605 |
| CN | 111083341 | | 4/2020 | |
| CN | 111107206 | | 5/2020 | |
| CN | 210899305 | | 6/2020 | |
| CN | 111447313 | | 7/2020 | |
| CN | 111510610 | | 8/2020 | |
| CN | 111510611 | | 8/2020 | |
| CN | 111654602 | | 9/2020 | |
| CN | 111711770 | | 9/2020 | |
| CN | 111970394 | | 11/2020 | |
| CN | 211908933 | | 11/2020 | |
| CN | 212324224 | | 1/2021 | |
| CN | 212343814 | | 1/2021 | |
| CN | 212367340 | | 1/2021 | |
| JP | 2008058471 | | 3/2008 | |
| WO | 2020177512 | | 9/2020 | |

OTHER PUBLICATIONS

USPTO, Office Action for U.S. Appl. No. 17/983,801, Jul. 8, 2024.
CNIPA, First Office Action for CN Application No. 202010456110.4, Oct. 17, 2024.
USPTO, Notice of Allowance for U.S. Appl. No. 17/983,801, Oct. 7, 2024.
CNIPA, Second Office Action for CN Application No. 202010456110.4, Mar. 28, 2025.
CNIPA, Decision of Rejection for CN Application No. 202010456110.4, May 30, 2025.
WIPO, International Search Report and Written Opinion for PCT/CN2021/095245, Aug. 12, 2021.
CNIPA, First Office Action for CN Application No. 202110260231.6, Oct. 25, 2021.
CNIPA, First Office Action for CN Application No. 202110261137.2, Nov. 29, 2021.
CNIPA, The Second Office Action for CN Application No. 202110260231.6, Mar. 16, 2022.
CNIPA, The Second Office Action for CN Application No. 202110261137.2, Mar. 8, 2022.
CNIPA, Notification to Grant Patent Right for Invention for CN Application No. 202110260231.6, Jun. 1, 2022.
CNIPA, Notification to Grant Patent Right for Invention for CN Application No. 202110261137.2,.
CNIPA, Notification to Grant Patent Right for Utility Models for CN Application No. 202020905913.9, Oct. 21, 2020.

* cited by examiner

CAMERA MODULE WITH ANNULAR LIGHT GUIDE MEMBER AND MOBILE TERMINAL

CROSS-REFERENCE TO RELATED APPLICATIONS

The present disclosure is a continuation of International Application No. PCT/CN2021/095245, filed May 21, 2021, which claims priority to: Chinese Patent Application No. 202010456110.4, filed May 26, 2020; Chinese Patent Application No. 202020905913.9, filed May 26, 2020; Chinese Patent Application No. 202110261137.2, filed Mar. 10, 2021; and Chinese Patent Application No. 202110260231.6, filed Mar. 10, 2021. The entire disclosures of the aforementioned applications are incorporated herein by reference.

TECHNICAL FIELD

The present disclosure relates to the field of optical imaging technologies, and more particularly, to a camera module and a mobile terminal.

BACKGROUND

Mobile terminals take mobile phones as an example. The mobile phone includes a camera and a flash lamp used to supplement light for the camera. When shooting a photographed object in a short distance, such as performing macro or ultra macro shooting, a distance between the camera and the photographed object is extremely small, and the flash lamp cannot supplement the light to a camera area under a macro or ultra macro shooting mode. The illumination of the photographed object in the camera area is obviously insufficient, and thus the photographed object cannot be shot clearly.

SUMMARY

The present disclosure provides a camera module and a mobile terminal with sufficient and uniform supplementary illumination.

In a first aspect, an embodiment of the present disclosure provide a camera module including:
- a lens assembly;
- a light guide member, being of an annular structure, and the light guide member is sleeved on an outer peripheral side of the lens assembly; and
- a light source, light emitted from the light source being incident in the light guide member through an outer peripheral side of the light guide member, and being emitted out through a light emitting surface of the light guide member, and the light emitting surface facing toward an object side of the lens assembly.

In a second aspect, an embodiment of the present disclosure provides a mobile terminal, including: the camera module and a housing; the housing is formed with a light-through opening, the camera module is disposed in the housing, and the light guide member is disposed at the light-through opening.

BRIEF DESCRIPTION OF THE DRAWINGS

In order to more clearly explain the technical solution of embodiments of the present disclosure, the following will briefly introduce the drawings needed in the embodiments. Apparently, the drawings in the following description are only some pf the embodiments of the present disclosure. For those skilled in the art, other drawings can be obtained from these drawings without any creative labor.

DETAILED DESCRIPTION OF PREFERRED EMBODIMENTS

In order to make purposes, technical solutions and advantages of the present disclosure clearer, the present disclosure will be further described in detail below in combination with the accompanying drawings. It should be noted that in the embodiments of the present disclosure, "peripheral direction" refers to a direction illustrated in FIG. 3, "top", "bottom" and "height direction" refer to directions illustrated in FIG. 4. In the description of the embodiments of the present disclosure, orientations or location relationships are only for the convenience of describing the present disclosure and simplifying the description, rather than indicating or implying that the device or member referred to must have the specific orientations, be constructed and operated in the specific orientations, it should not be considered as a limitation on the embodiments of the present disclosure. All other embodiments obtained by those skilled in the art without creative work belong to the scope of protection of the present disclosure.

Figure 1:
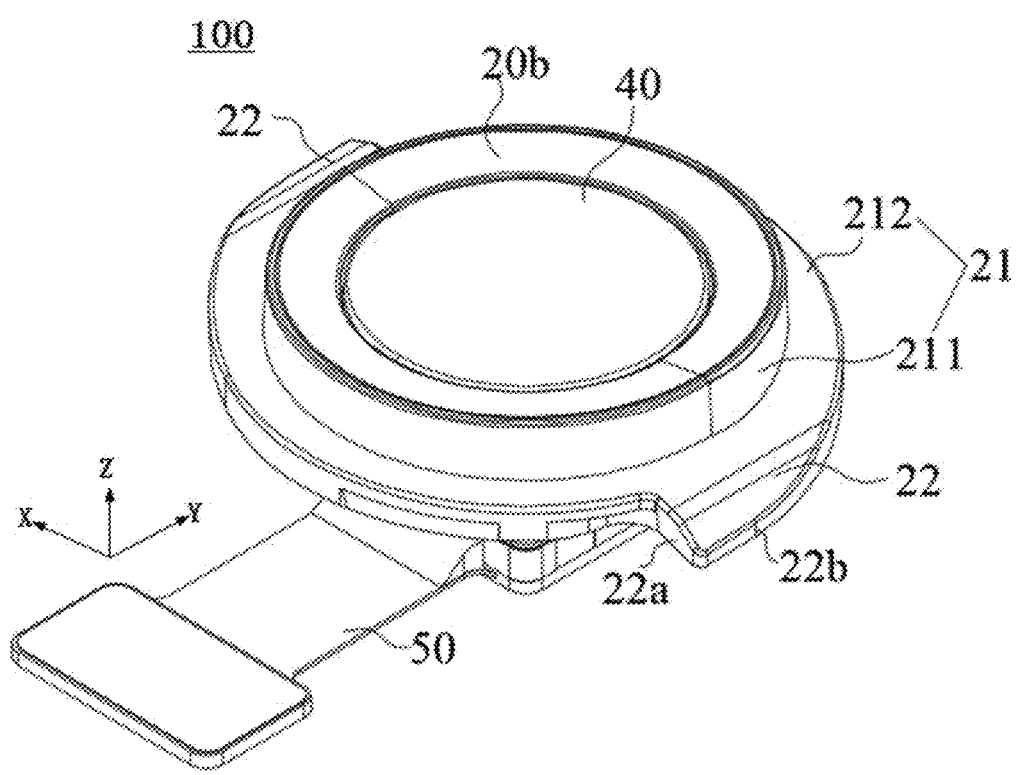
FIG. 1 illustrates a three-dimensional (3D) schematic diagram of a camera module according to a first embodiment of the present disclosure.
Figure 2:
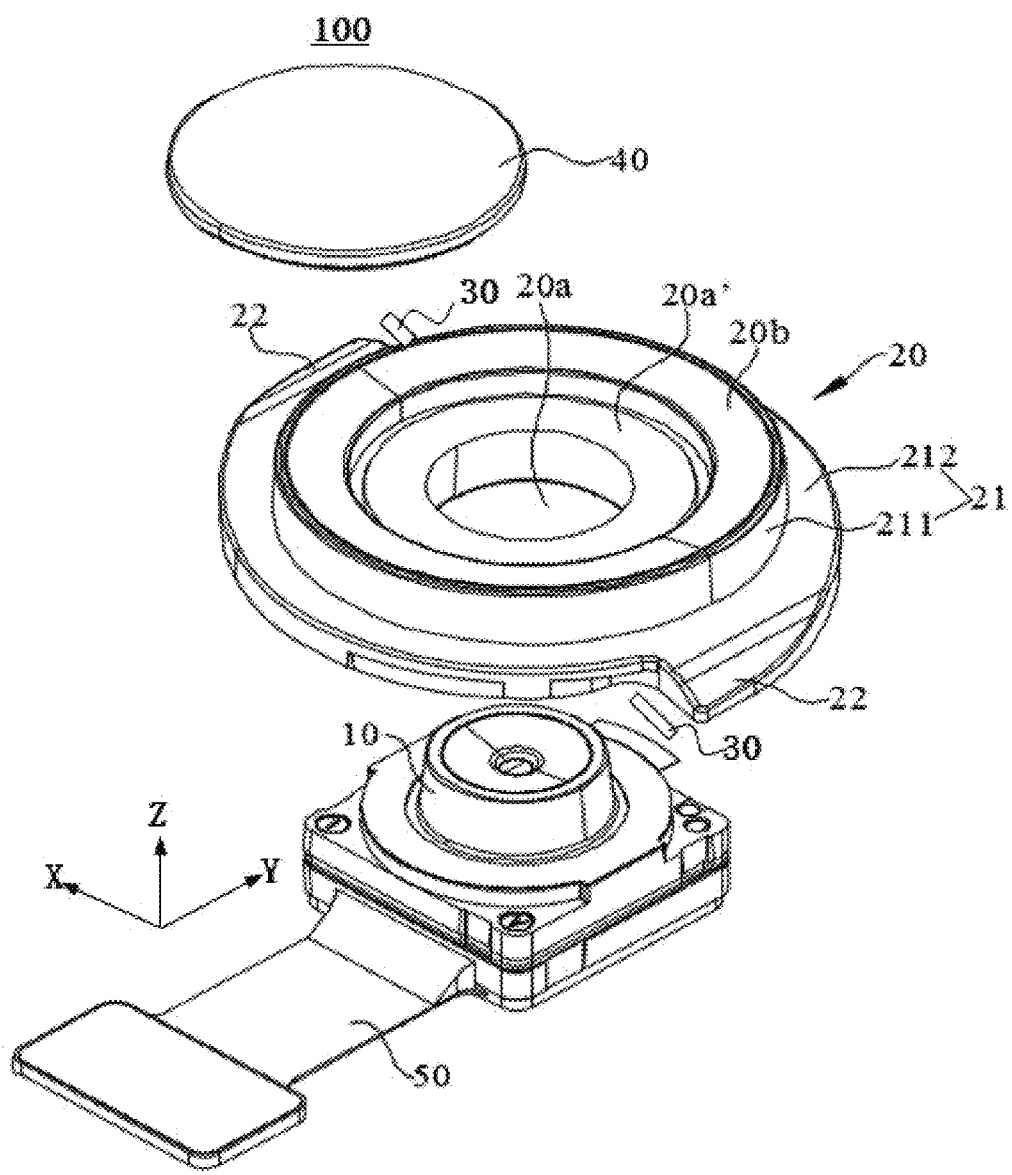
FIG. 2 illustrates a schematic diagram of a breakdown structure of the camera module illustrated in FIG. 1.

Referring to FIGS. 1 and 2, a camera module 100 is provided in an embodiment of the present disclosure. The camera module 100 may include a lens assembly 10, a light guide member 20, and a light source 30. The light source 30 may also be referred to as a supplementary light source.

Referring to FIG. 2, in order to facilitate the description, a direction of an optical axis (the optical axis is a line through a center of a lens) of the lens assembly 10 is defined as a thickness direction of the lens assembly 10, i.e., a Z-axis direction. A plane perpendicular to the direction of the optical axis of the lens assembly 10 is defined as a X-Y plane. In at least one alternative embodiment, a lens base of the lens assembly 10 is rectangular in shape, a length direction of the lens base of the lens assembly 10 is defined as a Y-axis direction, and a width direction of the lens base of the lens assembly 10 is defined as an X-axis direction, and a length of the Y-axis direction of the lens base is greater than or equal to a length of the X-axis direction of the lens base.

Figure 3:
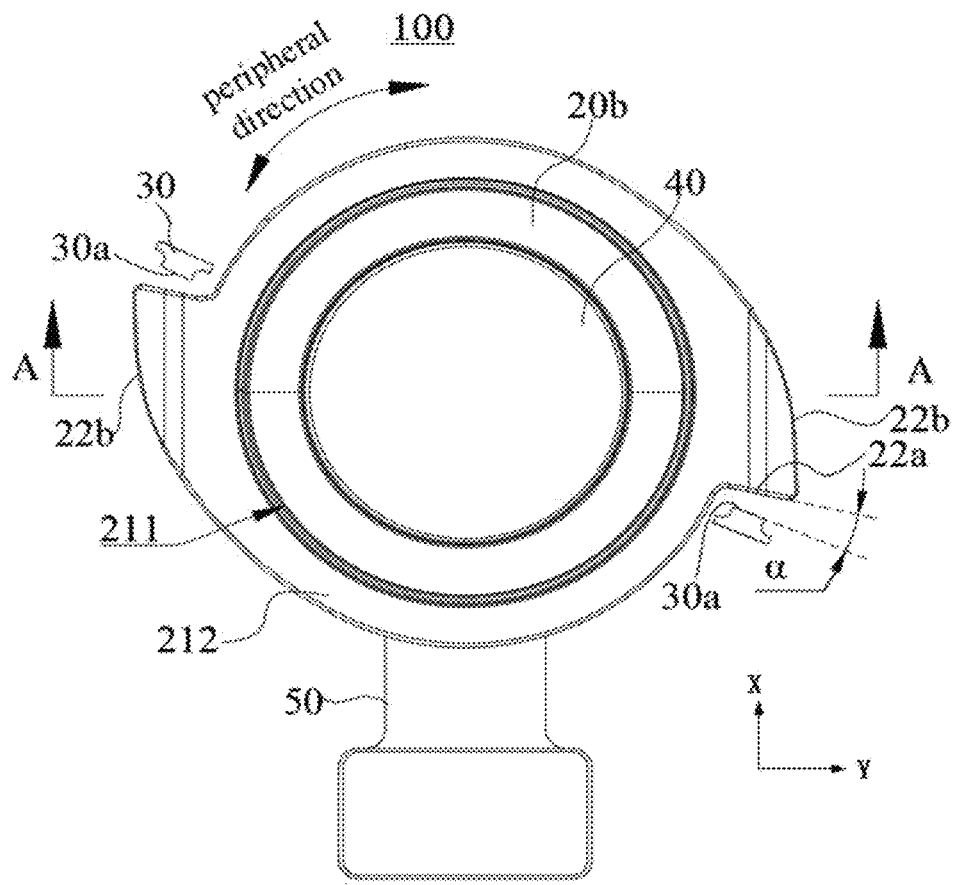
FIG. 3 illustrates a schematic diagram of a breakdown structure of the camera module illustrated in FIG. 1.
Figure 4:
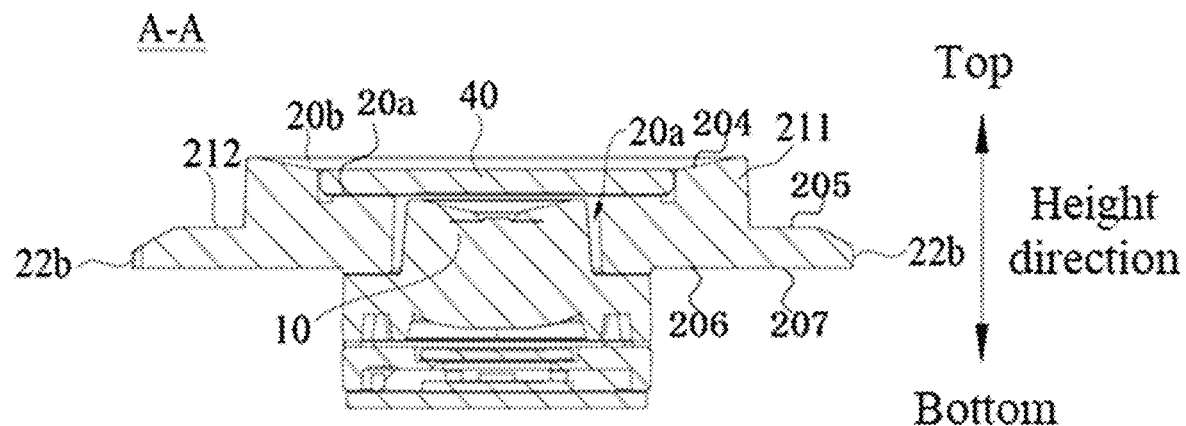
FIG. 4 illustrates a sectional view along a line A-A in FIG. 3.

Referring to FIG. 2, FIG. 3 and FIG. 4, the light guide member 20 is of an annular structure, and the light guide member 20 is sleeved on an outer peripheral side of the lens assembly 10. Specifically, the outer peripheral side of the lens assembly 10 refers to a side of the lens assembly 10 around the Z-axis direction. In other words, the outer peripheral side of the lens assembly 10 refers to a side of the light guide member 20 around the lens assembly 10 in the Z-axis direction. In at least one alternative embodiment, the light guide member 20 is provided with an incidence opening 20a that passes through the light guide member 20 in the Z-axis direction. An object side end of the lens assembly 10 is disposed at the incidence opening 20a.

An end of the lens assembly 10 facing toward a photographed object is the object side end, a direction of the Z-axis facing toward the object side end is a Z-axis positive direction. The light guide member 20 is sleeved on the object side end of the lens assembly 10, therefore light transmitted by the light guide member 20 emits a camera area of the lens assembly 10.

The light emitted from the light source 30 is incident in the light guide member 20 through an outer peripheral side of the light guide member 20, and is emitted out through the light emitting surface 20b of the light guide member 20, the light emitting surface 20b faces toward the object side of the lens assembly 10. In at least one alternative embodiment, the light emitting surface 20b is, but is not limited to, annular, etc. The outer peripheral side of the light guide member 20 is a side of the light guide member 20 around the Z-axis direction. It is noted that the object side described in the present disclosure is a side where the camera module 100 is used to shoot the photographed object, and the image side described in the present disclosure is a side where the camera module 100 is used to image (i.e., a side on which the image sensor is located).

In at least one alternative embodiment, the light source 30 is located on the outer peripheral side of the light guide member 20. An axial direction of the light guide member 20 is co-linear with a direction of the optical axis of the lens assembly 10, and the outer peripheral side of the light guide member 20 is an outer side of the light guide member 20 around the Z-axis direction.

The number of the light source 30 is at least one, and when the number of the light source 30 is a plurality, the plurality of light sources are provided on the outer peripheral side of the light guide member 20 around the Z-axis direction.

In the related art, a light-emitting lamp facing toward a bottom (back away from the light emitting surface) of the light guide member emits light, supplementary light beam from the bottom of the light guide member is incident into the light guide member, and is emitted out from a top of the light guide member. The light guide member usually has a certain light transmittance, the light-emitting lamp is lit, in terms of an appearance effect, a top surface of the light guide member is extremely bright at a location of the light-emitting lamp, and the brightness of the top surface of the light guide member far away from the light-emitting lamp decreased sharply, therefore, the top surface of the light guide member has poor uniformity of appearance brightness, the uniformity of the supplementary light on the camera area is also poor. As the light guide member has a certain degree of transparency, users can see the light-emitting lamp at the bottom of the light guide member through the light guide member, resulting in the problem of lamp exposing.

The camera module 100 provided by the embodiment of the present disclosure, by setting a light incident direction of the light guide member 20 to intersect with a light emitting direction of the light guide member 20, the light emitted from the light source 30 enters the light guide member 20 from the outer peripheral side of the light guide member 20, and does not directly emit toward the light emitting surface 20b, but the light is scattered and/or reflected and diffused in the light guide member 20 for several times to form a uniform and soft surface light, and then emit from the light emitting surface 20b to the camera area of the lens assembly 10. The surface light can illuminate the photographed object in the camera area, thus improving the brightness of the photographed object and achieving supplementing light. In this way, the light can be prevented from being emitted from a local concentration of the light emitting surface 20b, and further making the appearance uniformity of the light emitting surface 20b better after the light emitting surface 20b is lit, avoiding the problem of uneven distribution of light and darkness after the light emitting surface 20b is lit, and achieving that supplementary illumination of the camera module 100 is sufficient and uniform during the shooting.

For the technical solution of setting the light source 30 under the light guide member 20, a stacking thickness of the light source 30 and the light guide member 20 in the Z-axis direction is a sum of a thickness of the light source 30, a thickness of the light guide member 20 and a spacing distance between the light source 30 and the light guide member 20, thus the stacking thickness of the light source 30 and the light guide member 20 is relatively large, which leads to the camera module 100 occupying a relatively large thickness in the Z-axis direction. The technical solution of the present disclosure, by locating the light source 30 on the outer peripheral side of the light guide member 20, which can reduce a stacking size of the light source 30 and the light guide member 20 in the thickness direction (i.e., the Z-axis direction), thus freeing up space under the light guide member 20 for setting a circuit board or other electronic members, facilitating the formation of a compact stack and layout in the mobile terminal 1000, and also preventing the user from seeing the light source 30 through the light guide member 20. In this way, it is convenient to hide the light source 30 in other structures, improve the appearance fineness, and thus enhance the user experience.

It should be noted that the light source 30 includes, but is not limited to, a side light-emitting lamp or a side-mounted top light-emitting lamp, etc. In other words, the light source 30 is a light source that is placed frontways with respect to the lens assembly 10 and has a light output surface 30a on its side; or a light source that has a light output surface 30a on its top surface and is placed sideways with respect to the lens assembly 10. When its side is the light output surface 30a, the light output surface 30a connects the bottom surface (the surface facing toward the image side) of the light source 30 and the top surface (the surface facing toward the object side) of the light source 30. Electric terminals of the light source 30 are located on its bottom surface. The light output surface 30a does not directly face towards the light emitting surface 20b, and the light emitted by the light source 30 is scattered and/or reflected and diffused several times in the light guide member 20 to form a uniform and soft surface light, thereby improving the uniformity of the appearance and the uniformity of the supplementary light of the light emitting surface 20b.

Figure 5:
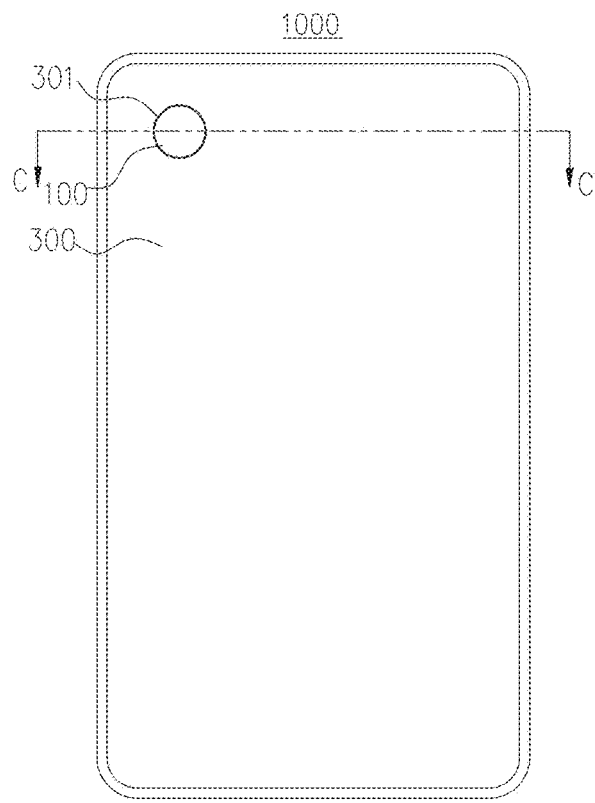
FIG. 5 illustrates a schematic structural diagram of a mobile terminal according to an embodiment of the present disclosure.
Figure 6:
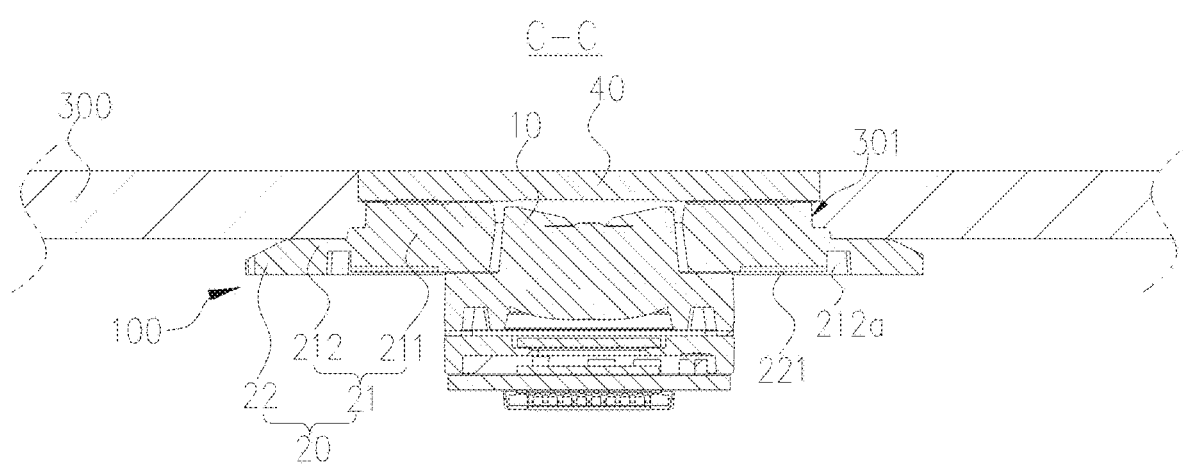
FIG. 6 illustrates a sectional view along a line C-C in FIG. 5.

Referring to FIG. 5 and FIG. 6, taking the camera module 100 applied to the mobile terminal 1000 as an example, the mobile terminal 1000 includes the camera module 100 provided in any one of the embodiments of the present disclosure and a housing 300, the housing 300 is formed with a light-through opening 301, the camera module 100 is located in the housing 300, and the light guide member 20 is located at the light-through opening 301.

In the mobile terminal 1000 provided in the embodiment of the present disclosure, the light guide member 20 is located at the light-through opening 301, the imaging light enters the lens assembly 10 through the light-through opening 301 and the incidence opening 20a, and the light is emitted from the light-through opening 301 into the camera area of the lens assembly 10. The housing 300 can protect the camera module 100, and the light source 30 can be hidden inside the housing 300 to avoid the user from viewing the light source 30, thus improving the aesthetics and appearance fineness of the mobile terminal 1000 and enhancing the user experience.

The mobile terminal 1000 provided in the embodiment of the present disclosure includes, but is not limited to, cell phones, tablet computers, personal digital assistants (PDAs) and portable computers, etc.

The lens assembly 10 in the embodiment of the present disclosure includes, but is not limited to, a macro lens or an ultra-macro lens, that is, the lens assembly 10 can be used for macro or ultra-macro shooting. In this way, the user can hold the mobile terminal 1000 close to the photographed object to achieve the macro or ultra-macro macro shooting.

The macro or ultra-macro shooting refers to the lens assembly 10 shooting at a large magnification when it is close to the photographed object. The macro shooting usually means that a distance between the lens assembly 10 and the photographed object is at a range from 2.5 cm to 10 cm, and the ultra-macro shooting usually means that a distance between the lens assembly 10 and the photographed object is within 1 cm. The lens assembly 10 provided the embodiment of the present disclosure is used for the macro or ultra-macro shooting at a large magnification, such as performing photography with an image ratio of 1:4 or greater (which may also be referred to as optical magnification), where the image ratio refers to the ratio between the imaging height of the image sensor and the height of the photographed object.

The ultra-macro camera may be a telephoto ultra-macro lens or a wide-angle ultra-macro lens. Exemplarily, the focal length f of the wide-angle ultra-macro lens takes a value range from 1.3 mm to 2.2 mm, and the FOV is at a range from 70° to 78°. Exemplarily, the effective focal length f of the wide-angle ultra-macro lens is 1.335 mm, the FOV at the maximum image height is 77.6 degrees, the aperture value (i.e., f-number) is 2.8, and the working distance is 3 mm to be able to image clearly, that is the lens is able to focus on the photographed object at a working distance of about 3 mm.

In the embodiment of the present disclosure, when the lens assembly 10 is used for the macro or ultra-macro shooting, because the light emitting surface 20b surrounds the outer peripheral side of the incidence opening 20a, and the light emitting surface 20b approaches to the incidence opening 20a, the distance between the lens assembly 10 and the photographed object is reduced, and the distance between the light emitting surface 20b of the light guide member 20 and the photographed object is simultaneously reduced, the light guide member 20 can direct the light to the camera area of the lens assembly 10, therefore the light can illuminate the photographed object, thus ensuring the camera module 100 to shoot.

In at least one alternative embodiment, referring to FIGS. 1 to 3, the camera module 100 further includes a flexible circuit board 50 and an image sensor. The image sensor is located on the image side of the lens assembly 10, and during the shooting process, the imaging light of the photographed object enters the lens assembly 10 and then reaches the image sensor, and photons in the imaging light hit the image sensor to generate movable charges, which is an internal photoelectric effect, and the movable charges converge to form an electrical signal. The flexible circuit board 50 is used to electrically connect the image sensor to the main board of the mobile terminal 1000. The main board is equipped with an analog-to-digital (A/D) converter and a digital signal processor (DSP). The A/D converter converts the electrical signal into a digital signal, and the digital signal is processed by the DSP. It is finally transmitted to a screen 17 (see FIG. 19) of the mobile terminal 1000 to display the image, i.e., the shooting of the photographed object is realized.

It should be noted that the image sensor can be complementary metal oxide semiconductor (CMOS) or charge coupled device (CCD), or other types of image sensors other than CMOS or CCD, such as charge injection device (CID) sensors. It is understood that for CMOS, DSP can be integrated within CMOS. CMOS has the advantages of high integration, low power consumption and low cost, and is more suitable for cell phones with limited installation space.

The flexible circuit board 50 can be a hard board or a combination of hard and soft boards.

In at least one alternative embodiment, the lens assembly 10 includes a lens barrel and a lens set disposed within the lens barrel, the lens set includes at least one lens. With a plane perpendicular to the optical axis of the lens assembly 10 as a projection plane, a projected outer contour of the lens barrel close to its object side end is circular.

The specific type of the light source 30 is not limited, the light source 30 of the embodiment of the present disclosure can be any one of a light emitting diode (LED) lamp, a metal halide lamp, a fluorescent lamp, a high pressure sodium, an incandescent lamp, an iodine tungsten lamp, a xenon gas lamp. Exemplarily, the light source 30 is the light emitting diode. The operation of the LED lamp is stable, and the LED lamp has low heat generation, low energy consumption and long service life.

In at least one alternative embodiment, referring to FIG. 3, a color temperature of the light source 30 is at a range from 5000 K to 14000 K. In this way, the light is close to the white light, to ensure that the color of the light emitted from the light emitting surface 20b is consistent, to avoid the color temperature of the light source 30 more than 14000 K out of the light color naked eye observation blue, so as to avoid the light affects the imaging effect of the lens assembly 10, to ensure the consistency of the color of the photographed object and the imaging picture color, and to avoid the light source more than 14000K out of the light color naked eye observation blue.

In at least one alternative embodiment, referring to FIG. 3, the light source 30 used as a breathing light. That is, the light source 30 can be used in addition to supplement light, but also as a reminder light. Exemplarily, the light source 30 preset a variety of flashing frequency to achieve information prompts, thus achieving the function of the breathing light. In at least one alternative embodiment, the light source 30 can change the color of the light to achieve the message prompt, thus achieving the function of the breathing light. In this way, the user is able to get information by the overall lighting frequency or color change of the light emitting surface 20b.

The specific location of the camera module 100 is not limited, in at least one alternative embodiment, the lens assembly 10 is located on a front side of the housing 300, that is, the camera module 100 is a front camera. In at least one alternative embodiment, the lens assembly 10 is located on a rear side of the housing 300, i.e., the camera module 100 is a rear camera.

It should be noted that in the embodiment of the present disclosure, the front side of the housing 300 is a side of the housing 300 facing toward the user when the screen 17 of the mobile terminal 1000 faces toward the user. The rear side of the housing 300 is a side opposite to its front side.

The specific shape of the light emitting surface 20b is not limited, exemplary, referring to FIGS. 1 to 3, the light emitting surface 20b is of annular shape. In this way, the light source 30 is lit, the light emitting surface 20b is uniformly bright ring, so as to supplement the light for various blocks in the camera area uniformly. In another embodiment of the present disclosure, the light emitting surface 20b can be a plurality of arcs and so on. For example, the light emitting surface 20b can also be spliced together by the plurality of arcs to form the annular shape.

The light emitting surface 20b of the light guide member 20 is provided with an incidence opening 20a, and the object side end of the lens assembly 10 is located at the incidence opening 20a. The image light enters the lens assembly 10 through the incidence opening 20a. In other words, the light guide member 20 is provided with the incidence opening 20a, and at least part of the top surface of the light guide member 20 is formed with the light emitting surface 20b surrounding the outer peripheral side of the incidence opening 20a, the top surface of the light guide member 20 faces toward the object side of the lens assembly 10.

Figure 7:
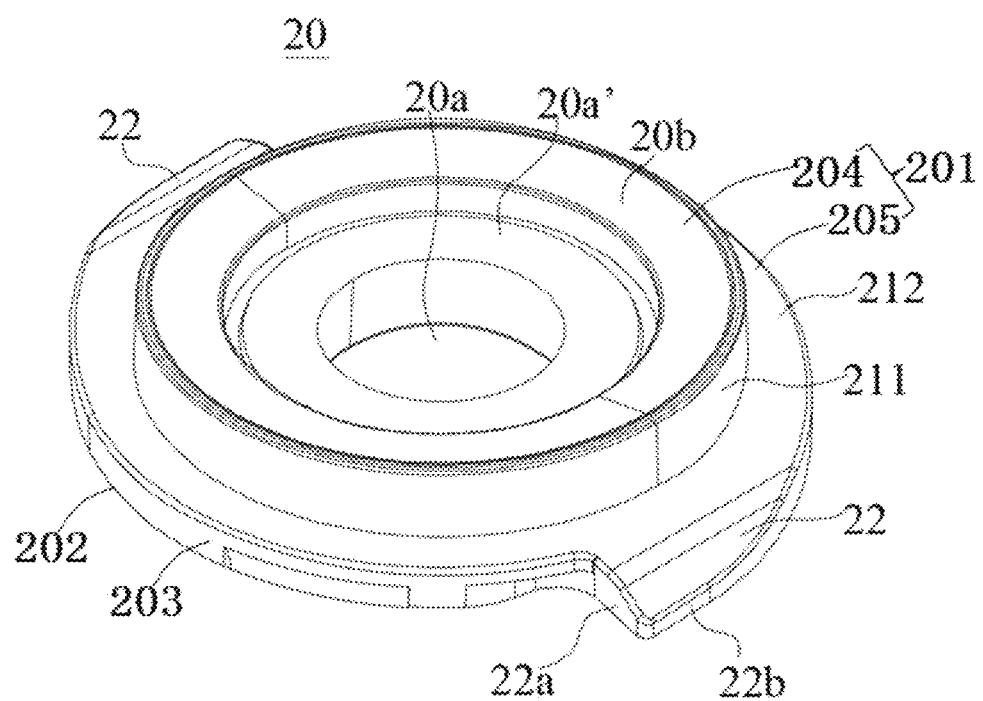
FIG. 7 illustrates a first schematic structural diagram of a first light guide member according to an embodiment of the present disclosure.
Figure 8:
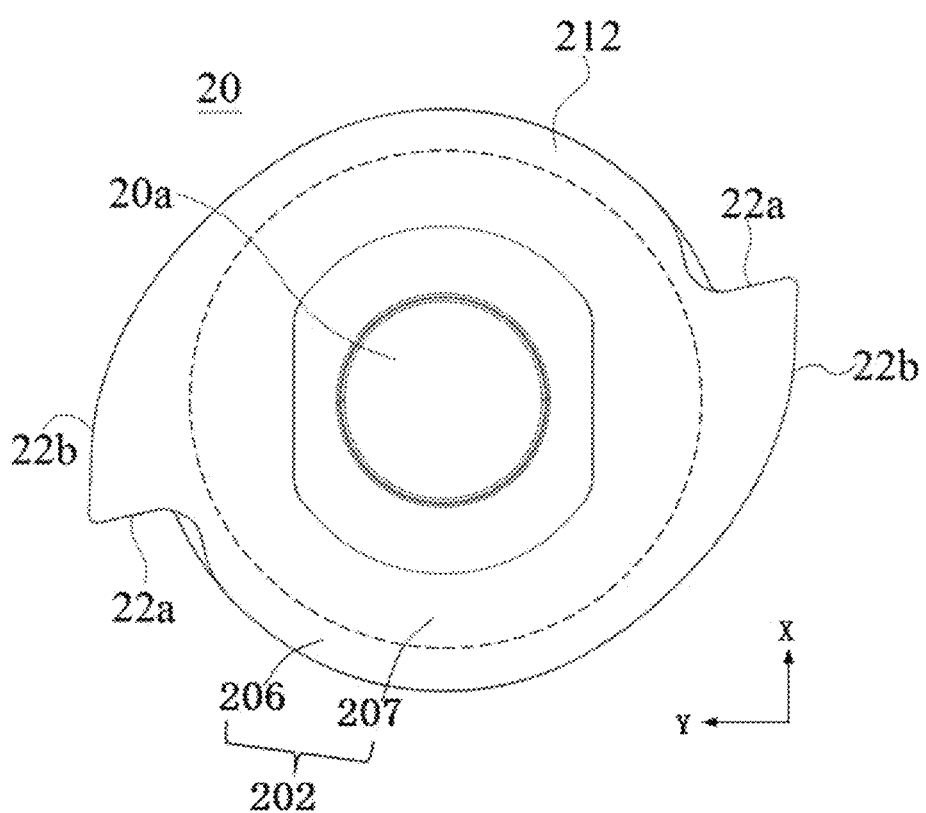
FIG. 8 illustrates a second schematic structural diagram of the first light guide member illustrated in FIG. 7.

Referring to FIG. 7 and FIG. 8, the light guide member 20 is further provided with a light incident surface 22a for the light emitted by the light source 30 to be incident. An inclined angle between the light incident surface 22a and the direction of the optical axis of the lens assembly 10 is [0,90°). In other words, the light incident surface 22a is parallel to or intersects the direction of the optical axis of the lens assembly 10. In at least one alternative embodiment, the light incident surface 22a is parallel to the Z-axis direction or has a small angle (less than 90°) with the Z-axis direction, in other words, the light incident surface 22a is not perpendicular to the Z-axis direction.

The specific structure of the light guide member 20 is not limited, for example, referring to FIG. 7 and FIG. 8, the light guide member 20 includes a light guide body 21 and a light incident part 22. The light guide body 21 is sleeved on the outer peripheral side of the lens assembly 10. The light incident part 22 is provided on the outer peripheral side of the light guide body 21 or on the image side of the light guide body 21. The light guide body 21 is integrally formed with the light incident part 22. The light guide body 21 is provided with a first surface 201 (also referred to as the top surface of the light guide body 21, which is also the surface of the light guide body 21 facing toward the object side) and a second surface 202 (also referred to as the bottom surface of the light guide body 21, which is also the surface of the light guide body 21 facing toward the image side) provided back-to-back, and a first peripheral side 203 (the first peripheral side 203 is also referred to as the outer peripheral side of the light guide body 21) connected between the first surface 201 and the second surface 202. The incidence opening 20a penetrates from the first surface 201 to the second surface 202. The light incident surface 22a is disposed on the light incident part 22 and the light emitting surface 20b is disposed on the light guide body 21. A part or all of the area of the first surface 201 forms the light emitting surface 20b.

The structure of the light guide member 20 provided in the present disclosure is described specifically in the following by several embodiments.

In a first embodiment of a first light guide member 20, referring to FIGS. 7 and 8, the light incident part 22 is provided on the outer peripheral side of the light guide body 21. In other words, the light incident part 22 is convexly disposed on the first peripheral side 203, and the light incident part 22 can be seen to be formed as a part of the light guide body 21 extending outward in a radial direction. Among them, a part of the first peripheral side 203 extends radially outwards to form the light incident surface 22a and the light incident peripheral side 22b surrounding the side of the light incident part 22. The present disclosure does not limit that the part of the first peripheral side 203 extending radially outwards is uniform or non-uniform extending. The surface of the light incident part 22 toward the object side and the surface of the light guide body 21 toward the object side may be flush or have a drop. The surface of the light incident part 22 toward the image side and the surface of the light guide body 21 toward the image side may be flush or have a drop. The light incident surface 22a connects the surface of the light incident part 22 toward the object side and the surface of the light incident part 22 toward the image side.

In at least one alternative embodiment, the light incident surface 22a extends outwards from the first peripheral side 203 (the outer peripheral side of the light guide body 21) in a direction gradually far away from the optical axis of the lens assembly 10. The extension direction of the light incident surface 22a is parallel to or intersects the radial direction of the lens assembly 10. In at least one alternative embodiment, the light incident surface 22a extends outwards from the outer peripheral side of the light guide body 21 in a radial direction of the lens assembly 10. In at least one alternative embodiment, there is an included angle between the extension direction of the light incident surface 22a and the radial direction of the lens assembly 10.

Figure 9:
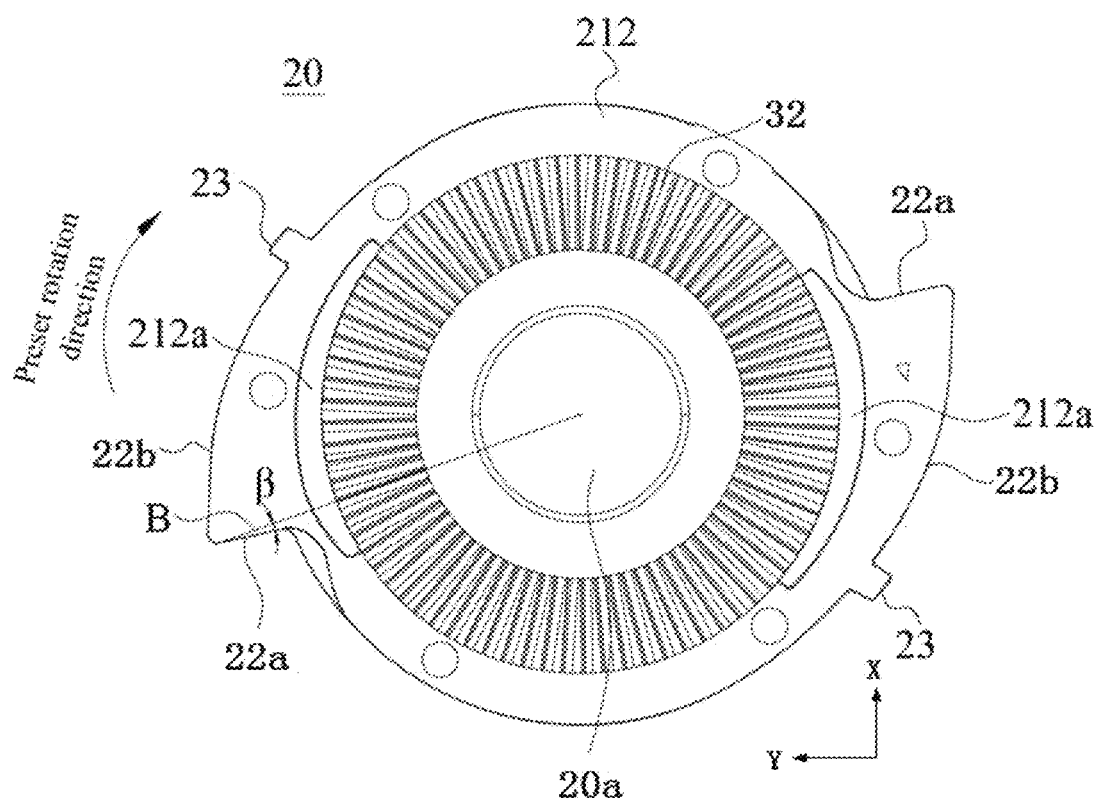
FIG. 9 illustrates a first schematic structural diagram of a second light guide member according to an embodiment of the present disclosure.

Referring to FIG. 9, with a plane perpendicular to the optical axis of the lens assembly 10 as a projection plane, an included angle between a projection line of the light incident surface 22a on the projection plane and a reference radial direction of the lens assembly 10 is at a range from 0° to 10°. The reference radial direction is a radial direction of a projection point formed on a projection plane through an edge of the light incident surface far away from the outer peripheral side of the light guide body 21. In other words, a projection profile of the incidence opening 20a is circular, a line between a circle center of the projection of the incidence opening 20a and a radially outermost end point of the projection line of the light incident surface 22a is the reference line, and the included angle between the projection line of the light incident surface 22a and the reference line is at a range from 0° to 10°. Exemplarily, the included angle β between the projection line of the light incident surface 22a and the reference line B is 0°, 1°, 2°, 3°, 4°, 5°, 7°, 9° or 10°, etc. In this way, the included angle β between the projection line of the light incident surface 22a and the reference line B can be avoided to be too large, on the one hand, to avoid excessive inclination of the light incident surface 22a towards a radial inner side of the annular light guide ring 212, the light is emitted from the outer peripheral side 22b of the light incident part after being emitted from the light incident surface 22a, resulting in excessive light loss; on the other hand, to avoid excessive inclination of the light incident surface 22a towards a radial outer side of the annular light guide ring 212, the light directly enters the light guide body 21 along the radial direction of the annular light guide ring 212 after entering the light incident surface 22a, which leads to the high brightness of the place where the light incident surface 22a is located and the problem of lamp exposing.

The present disclosure does not specifically limit positions of the light incident surface 22a and the light emitting surface 20b in the X-Y plane. In at least one alternative embodiment, the plane perpendicular to the optical axis of the lens assembly 10 is used as the projection plane, and the projection line of the light incident surface 22a connects a projection outer contour edge line of the light emitting surface 20b, therefore the light guide member 20 can have a small volume while achieving its uniform illumination.

Figure 10:
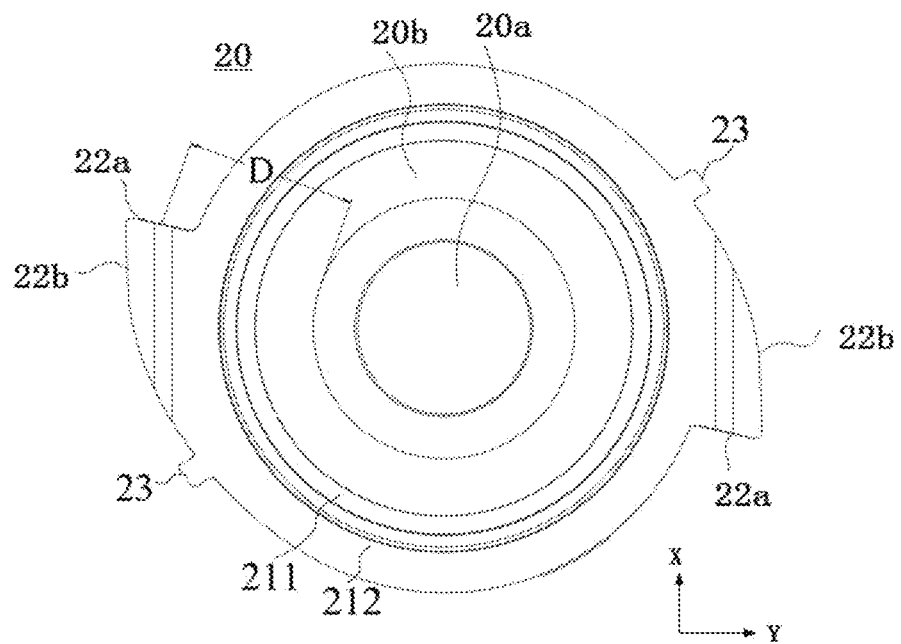
FIG. 10 illustrates a schematic structural diagram of a third light guide member according to an embodiment of the present disclosure.

In at least one alternative embodiment, referring to FIG. 10, with the plane perpendicular to the optical axis of the lens assembly 10 as the projection plane, a minimum distance D between a center point of the projection line of the light incident surface 22a on the projection plane and the projection outer contour edge line of the light emitting surface 20b on the projection plane is at a range from 2.5 mm to 4.0 mm. Exemplarily, the minimum distance D between the center point of the projection line of the light incident surface 22a and the projection outer contour edge line of the light emitting surface 20b is 2.5 mm, 3.0 mm, 3.5 mm or 4.0 mm, etc. On the one hand, the problem of lamp exposing caused by the distance between the center point of the projection line of the light incident surface 22a and the projection outer contour edge line of the light emitting surface 20b being too close can be avoided; on the other hand, it can avoid that the distance between the center point of the projection line of the light incident surface 22a and the projection outer contour edge line of the light emitting surface 20b is too far, and the light path of the light is too long and the light loss is too large.

The specific structure shape of the light incident part 22 is not limited, exemplarily, please refer to FIG. 3, FIG. 5 and FIG. 6, with the plane perpendicular to the optical axis of the lens assembly 10 as the projection plane, the light incident part 22 is roughly fish fin-shaped, and a contour line of the outer peripheral side 22b of the light incident part is an outwardly convex arc.

Specifically, the light incident part 22 is provided with a light incident peripheral side 22b, an end of which is connected to the light incident surface 22a, and another end of which is gradually far away from the light incident surface 22a and connected to the first peripheral side 203. The light incident peripheral side 22b is a convex arc surface, and the transition between the first peripheral side 203 and the light incident peripheral side 22b is smooth. On the one hand, by setting the light incident peripheral side 22b as the convex arc surface, the light coming from the light incident surface 22a can be reflected by the curvature gradient of the light incident peripheral side 22b at various reflection angles, therefore making the light beam emitted in a large range, and the light beam reflected by the light incident peripheral side 22b can be projected into a larger area on the annular light guide ring 212, and on the other hand, the smooth transition between the first peripheral side 203 and the light incident peripheral side 22b not only avoids the formation of sharp corners on the light incident part 22, thus reducing the loss in the light propagation process, but also makes the light reflection process on the light incident peripheral side 22b and the first peripheral side 203 continuous and uniform, and thus the angle of the emitted light is also gradual, avoiding sudden changes in the angle of reflection and resulting in uneven brightness due to undistributed light in certain areas; it also makes the overall size of the light guide member 20 relatively small, which is easy to install it in the space between the lens assembly 10 and the housing 300.

In at least one alternative embodiment, referring to FIG. 3, the light source 30 is provided with a light output surface 30a, and the light output surface 30a faces toward the light incident surface 22a, where the light output surface 30a faces toward the light incident surface 22a, which means that the light output surface 30a and the light incident surface 22a parallel and have a small spacing; or, the light output surface 30a and the light incident surface 22a have a certain angle between them. The distance between the light output surface 30a and the light incident surface 22a increases gradually along the direction (i.e., in the radial outward direction) of the optical axis far away from the lens assembly 10.

The included angle α between the plane in which the light output surface 30a is located and the plane in which the light incident surface 22a is located is at a range from 0° to 20°. Exemplarily, the included angle α between the plane in which the light output surface 30a is located and the plane in which the light incident surface 22a is located is 0°, 1°, 2°, 5°, 8°, 10°, 15°, 19° or 20°, etc. On the one hand, it can avoid that the included angle α between the plane where the light output surface 30a is located and the plane where the light incident surface 22a is located is too large, the light will be emitted from the outer peripheral side of the light incident part after being emitted from the light incident surface 22a, resulting in excessive light loss. On the other hand, it can avoid the excessive inclination of the light output surface 30a towards the radial inner side of the lens assembly 10, after the light is emitted from the light incident surface 22a, it does not reflect evenly in the light incident part 22 and then directly shoots into the light guide body 21 along the radial direction of the lens assembly 10, which leads to the high brightness of the light incident surface 22a and increases the degree of the lamp exposing. In other words, by reasonably designing the included angle between the light output surface 30a and the light incident surface 22a, the light emitted from the light incident surface 22a is fully reflected in the light incident part 22 and then emits into the light guide body 21, the light in the light incident part 22 is emitted in more directions and the range of the light is large, and the light incident part 22 converts a small range of incident light from the light incident surface 22a into a larger range of incident light, therefore the light can be directed into the light guide body 21 in each direction and then dispersed in each position of the light guide body 21, thus presenting a uniform brightness in the light guide body 21.

The light enters the light guide body 21 roughly in a peripheral direction of the lens assembly 10 after being reflected by the light incident part 22, which can prevent the light from being concentrated and entering the light guide body 21 directly along the radial direction of the lens assembly 10, thereby further preventing the light emitting surface 20b from being too bright at the location of the light source 30 and further reducing the degree of lamp exposing. The light guide body 21 can disperse the light and avoid concentrated light, thereby the light from the light emitting surface 20b has better uniformity, further avoiding the uneven light problem of the light emitting surface 20b, and further improving the appearance uniformity of the light emitting surface 20b and the uniformity of supplementary light to the camera area.

There is no limit to the number of the light incident part 22, referring to FIG. 3 for an example, and the number of the light incident part 22 is a plurality, therefore more the light can enter the light guide body 21 and the overall brightness can be increased. The plurality of light incident parts 22 are spaced along the peripheral direction of the lens assembly 10 (also the peripheral direction of the light guide body 21), such as uniformly distributed, and the light sources 30 and the light incident parts 22 are arranged in one-to-one correspondence. In this way, the uniformity of the supplementary light can be improved. Exemplarily, the number of the light incident parts 22 is two, and the two light incident parts 22 are evenly spaced along the peripheral direction of the lens assembly 10 (also the peripheral direction of the light guide body 21). In at least one alternative embodiment, the number of the light incident part 22 is one and the number of the light source 30 is also one.

It should be noted that the plurality in the embodiment of the present disclosure refers to the number of two and more than two. For example, the number of the light incident parts 22 is in a range from 2 to 20. In this way, it is possible to balance the uniformity and intensity of the supplementary light.

The following is an example of the specific structure of the light guide body 21 in conjunction with the attached drawings.

In at least one alternative embodiment, referring to FIGS. 7 and 8, the light guide body 21 includes a light guide column 211 forming an incidence opening 20a and an annular light guide ring 212 surrounding the outer periphery of the light guide column 211. The top surface of the annular light guide ring 212 is lower than the top surface of the light guide column 211 in the height direction of the light guide member 20. In other words, the first surface 201 includes a first subsurface 204 disposed on the light guide column 211 and a second subsurface 205 disposed on the annular light guide ring 212. The first subsurface 204 is the surface of the light guide column 211 facing toward the object side. The second subsurface 205 is the surface of the annular light guide ring 212 facing toward the object side. At least part of the first subsurface 204 forms the light emitting surface 20b, and the light incident part 22 is disposed on the outer peripheral side of the annular light guide ring 212.

In at least one alternative embodiment, both the first subsurface 204 and the second subsurface 205 are annular in shape. In at least one alternative embodiment, the first subsurface 204 is close to the object side with respect to the second subsurface 202. That is, the first subsurface 204 is far away from the second surface 202 relative to the second subsurface 205, a connecting surface between the first subsurface 204 and the second subsurface 205, and the second subsurface 205 forms a step surface which allows the light guide column 211 to extend out of the light-through opening 301 and the second subsurface 205 is abutted against the inner surface of the housing 300 to enable the light guide member 20 to be assembled on the housing 300. In other embodiments, the first subsurface 204 is flush with the second subsurface 205. At least part of the first subsurface 204 forms the light emitting surface 20b. In at least one alternative embodiment, the first subsurface 204 is the light emitting surface 20b. In other words, the annular light guide ring 212 is blocked by the housing 300, etc.

After the light is diffused by the light incident part 22, the light enters the annular light guide ring 212, which further disperses the light, and the uniformly distributed light in the annular light guide ring 212 enters the light guide column 211, making the light from the light emitting surface 20b more uniform, further avoiding the problem of uneven light and darkness on the light emitting surface 20b, further improving the appearance uniformity of the light emitting surface 20b and the uniformity of the supplementary light to the camera area. The annular light guide ring 212 is closer to the light incident part 22, and there is a risk of localized brightness differences in the annular light guide ring 212, the annular light guide ring 212 is blocked by the housing 300, which does not appear on the apparent surface of the mobile terminal 1000, thus it can further make the emitted light uniform. In addition, because the annular light guide ring 212 is spaced between the light source 30 and the light guide column 211, it is not easy to see the light source 30 on the apparent surface of the mobile terminal 1000 even from the side angle, reducing the risk of lamp exposing.

In the embodiment, the outer peripheral side of the annular light guide ring 212 is the first peripheral side 203, and the light incident part 22 is disposed on the outer peripheral side of the annular light guide ring 212.

The specific structure and shape of the light guide column 211 are not limited. In at least one alternative embodiment, referring to FIG. 3, FIG. 7 and FIG. 8, with the plane perpendicular to the optical axis of the lens assembly 10 as the projection surface, the projection outer contour of the light guide column 211 is circular, that is, the light guide column 211 is roughly cylindrical.

In at least one alternative embodiment, referring to FIGS. 3, 7 and 8, a part of the annular light guide ring 212 extends outwardly incrementally in a peripheral direction to form the light incident part 22. An outwardly extending end surface is the light incident surface 22a. in this way, the area of the light incident surface 22a is larger, and the light enters the light incident part 22 from the light incident surface 22a.

In at least one alternative embodiment, referring to FIGS. 4 and 7, the annular light guide ring 212 surrounds the bottom of the light guide column 211, the distance between the light incident surface 22a and the light emitting surface 20b is farther in the height direction of the light guide member 20, in order to further reduce the degree of lamp exposing.

In other words, the second surface 202 further includes a third subsurface 206 provided on the light guide column 211 and a fourth subsurface 207 provided on the annular light guide ring 212. The third subsurface 206 is the surface of the light guide column 211 facing toward the image side. The fourth subsurface 207 is the surface of the annular light guide ring 212 facing toward the image side.

In at least one alternative embodiment, the fourth subsurface 207 is located between the plane in which the first subsurface 201 is located and the plane in which the third subsurface 206 is located. Specifically, the third subsurface 206 and the fourth subsurface 207 have a drop-off in the Z-axis direction. In at least one alternative embodiment, the drop-off between the third subsurface 206 and the fourth subsurface 207 in the Z-axis direction forms a step surface, which forms an avoidance space for mounting other devices on the side of the annular light guide ring 212 back from the housing 300.

In at least one alternative embodiment, the fourth subsurface 207 is co-planar with the third subsurface 206, the surfaces of the light guide column 211 and the annular light guide ring 212 back from the object side are connected as a single large surface to increase the support area. Further, the surface of the light incident part 22 facing away from the object side end is connected with the surfaces of the light guide column 211 and the annular light guide ring 212 that face away from the object side end to form a large integral surface, and thus the light guide member 20 has a relatively flat surface for easy assembly.

At least part of the surface of the light guide member 20 facing toward the image side, a part of the outer peripheral side of the light guide member 20, and a part of the light guide member 20 facing toward the object side are provided with one of a reflective layer and a light shading layer.

In at least one alternative embodiment, at least one of the second subsurface 205 of the light guide column 211, the fourth subsurface 207 of the annular light guide ring 212, the outer peripheral side of the annular light guide ring 212 (i.e., the first peripheral side 203), and the second subsurface 205 of the annular light guide ring 212 is provided with one of the reflective layer and the light shading layer to prevent light from being emitted through the above-mentioned surfaces, thereby increasing the amount of light emitted from the light emitting surface 20b and improving utilization of the light.

Figure 21:
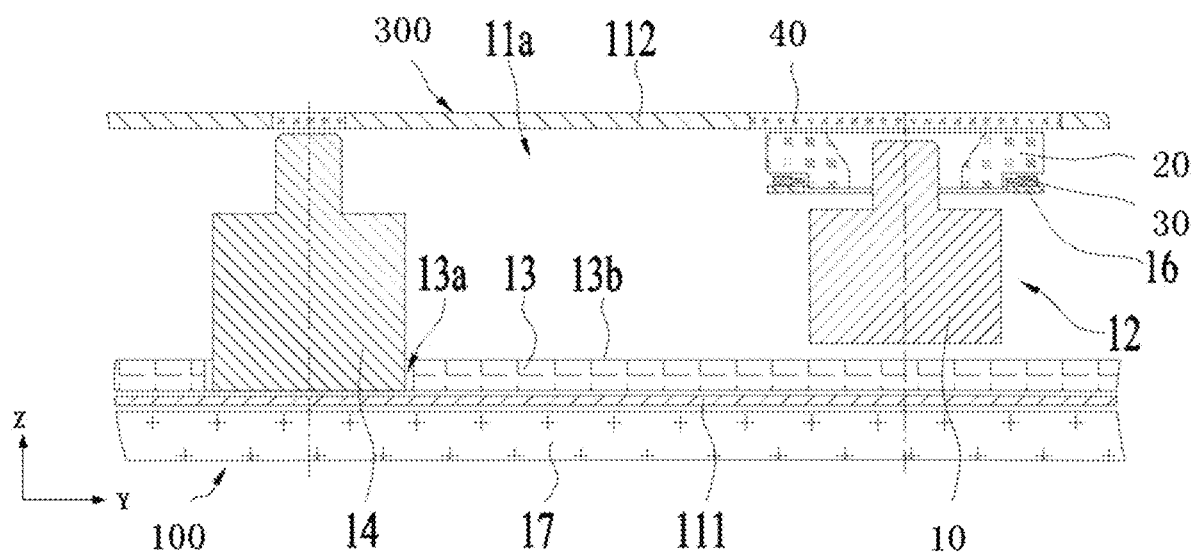
FIG. 21 illustrates a sectional view of a still another camera module according to the third embodiment of the present disclosure.

Specifically, referring to FIG. 9, FIG. 10 and FIG. 21, at least one of the bottom surface of the annular light guide ring 212, the outer peripheral side of the annular light guide ring 212 and the top surface of the annular light guide ring 212 is provided with the reflective layer (not shown). The reflective layer is used to make the light enter the light guide column 211 after being reflected inside the annular light guide ring 212 and avoid the light to emit from the annular light guide ring 212.

Specifically, referring to FIG. 9, FIG. 10 and FIG. 21, at least one of the bottom surface of the annular light guide ring 212, the outer peripheral side of the annular light guide ring 212 and the top surface of the annular light guide ring 212 is provided with the light shading layer (not shown). The light shading layer is used to avoid the light to emit from the annular light guide ring 212 and to improve the aesthetic appearance.

In at least one alternative embodiment, the light shading layer can be a dark ink layer. For example, the light shading layer can be a black ink layer or a gray ink layer, etc.

In at least one alternative embodiment, referring to FIG. 3 and FIG. 7, with the plane perpendicular to the optical axis of the lens assembly 10 as the projection plane, a circle in which the projection outer contour line of the annular light guide ring 212 is located is approximately tangent to a circle in which the projection contour line of the outer peripheral side 22b of the light incident part 22 is located, and a tangent point between the above two is located at an end of the light incident part 22 far away from the light incident surface 22a. In this way, it is further convenient for the light incident part 22 to direct light into the annular light guide ring 212.

In at least one alternative embodiment, referring to FIGS. 1 to 4, the camera module 100 includes a cover plate 40 located on the object side of the lens assembly 10, the object side end of the lens assembly 10 is located within the incidence opening 20a, and the cover plate 40 closes the incidence opening 20a. The cover plate 40 has a light-transmitting area. External light enters the lens assembly 10 through the light-transmitting area of the cover plate 40 and the incidence opening 20a.

Specifically, the object side end of the lens assembly 10 extends into the incidence opening 20a from the bottom side of the incidence opening 20a, and the cover plate 40 closes the top of the incidence opening 20a to protect the lens assembly 10 from damage to the lens group. The object side end of the lens assembly 10 is located within the incidence opening 20a, and the cover plate 40 closes the incidence opening 20a, making the distance between the lens set and the cover plate 40 smaller, on the one hand, by shortening the distance between the lens set and the cover plate 40, the foreign matters on the inside of the cover plate 40 can be further away from the object side of the lens closest to the cover plate 40, thus improving the tolerance of the lens set to the foreign matters such as white spot hair, and reducing the adverse effects of white spot hair during the assembly. On the other hand, the size of the camera module 100 in the height direction is reduced, and the mobile terminal 1000 can be thinner and lighter.

In at least one alternative embodiment, the top of the light guide column 211 and the cover plate 40 together close the light-through opening 301. The light emitting surface 20b is located at the light-through opening 301, and the light emitting surface 20b is close to the photographed object for supplementing light. The annular light guide ring 212 can be hidden into the housing 300, and the user views the camera module 100 from the object side of the lens assembly 10, minimizing the part of the light guide member 20 visible to the user and further improving aesthetics.

Figure 11:
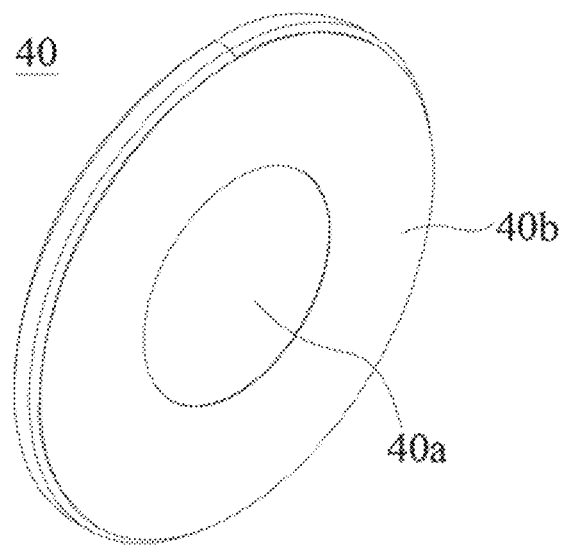
FIG. 11 illustrates a schematic structural diagram of a cover plate according to an embodiment of the present disclosure.
Figure 12:
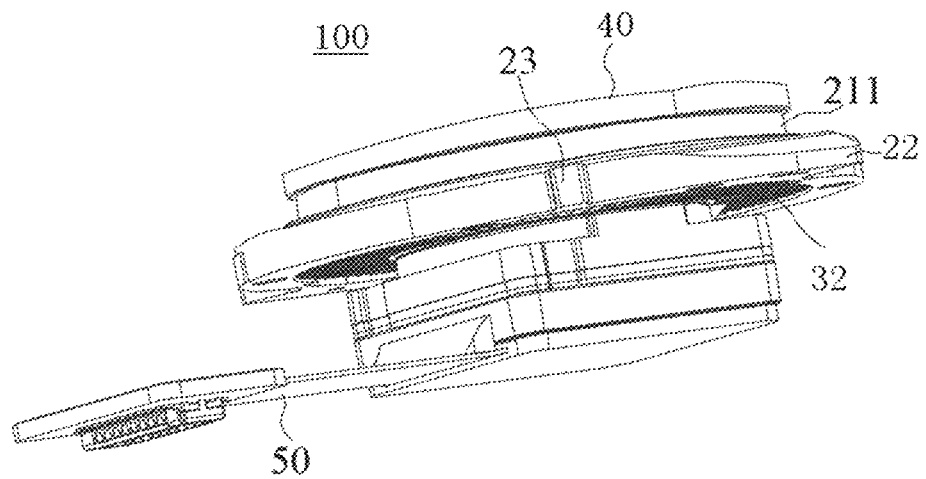
FIG. 12 illustrates a 3D schematic diagram of another camera module according to the first embodiment of the present disclosure.
Figure 13:
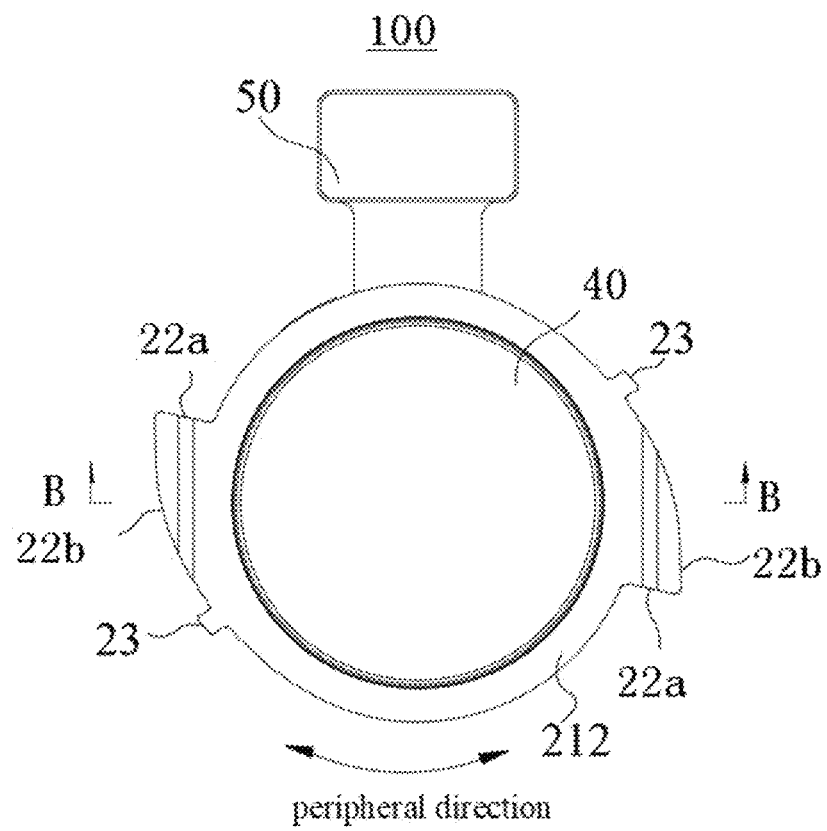
FIG. 13 illustrates a top view of the camera module illustrated in FIG. 12.

Referring to FIG. 11, the cover plate 40 is provided with a viewing area 40a and an annular light shading area 40b surrounding the outer periphery of the viewing area 40a, the light transmission of the viewing area 40a is greater than the light transmission of the annular light shading area 40b. With the plane perpendicular to the optical axis of the lens assembly 10 as the projection plane, the projection of the lens of the lens assembly 10 is located within the projection of the viewing area 40a.

On the one hand, the cover plate 40 closes the top of the incidence opening 20a to protect the lens assembly 10 from damage to the lens. On another hand, the imaging light passes through the viewing area 40*a* into the lens, and the viewing area 40*a* has a larger transmittance to reduce the influence of the viewing area 40*a* on the imaging light, most of the imaging light can enter the lens assembly 10 through the viewing area 40*a* to ensure the imaging quality. On a still another hand, when the user views the cover plate 40 from the object side of the lens assembly 10, the smaller transmittance of the annular light shading area 40*b* prevents the user from clearly seeing the structure located behind the annular light shading area 40*b*. On an even still another hand, when the user sees the cover plate 40, the cover plate 40 has a record-shaped appearance with a ring-shaped area, which is visually aesthetically pleasing, and therefore, improves the aesthetics of the camera module 100.

Exemplarily, the light transmittance of the annular light shading area 40*b* may be equal to or greater than 0% and less than 100%. For example, the light transmission of the annular light shading area 40*b* may be 0%, that is, the annular light shading area 40*b* approximates a completely light-opaque structure.

The material of the cover plate 40 is not limited, for example, the cover plate 40 includes, but is not limited to, glass or plastic, etc.

There is no limit to the way in which the light transmittance of the viewing area 40*a* is greater than the light transmittance of the annular light shading area 40*b*. Exemplarily, the viewing area 40*a* and the annular light shading area 40*b* are made of different materials, for example, the viewing area 40*a* is made of glass with higher transmittance and the annular light shading area 40*b* is made of plastic with lower transmittance. In at least one alternative embodiment, the viewing area 40*a* and the annular light shading area 40*b* are made of plastic with different light transmission rates, for example, the cover plate 40 can be formed by a two-color injection molding process. The top or bottom surface of the annular light shading area 40*b* is provided with the light-blocking structure to reduce the light transmission rate of the annular light shading area 40*b*, for example, the light-blocking structure is the dark ink layer, the dark color includes but not limited to black or gray, etc. The top or bottom surface of the cover plate 40 can also be frosted to form the light-blocking structure.

To further avoid the flare phenomenon, in at least one alternative embodiment, the inner peripheral side wall of the incidence opening 20*a* is provided with a light blocking layer. The light blocking layer can block the light from the inner peripheral wall of the incidence opening 20*a* to the lens assembly 10, thus avoiding the flare phenomenon.

The specific structure of the light blocking layer is not limited. Exemplarily, the light blocking layer includes, but is not limited to, the dark ink layer, such as the gray ink layer or the black ink layer, etc.

In at least one alternative embodiment, referring to FIG. 2 and FIG. 4, the inner peripheral wall surface of the incidence opening 20*a* is formed with a step surface 20*a*', and the cover plate 40 is supported on the step surface 20*a*'. In this way, the distance between the cover plate 40 and the lens closest to the cover plate 40 can be further reduced, and the thickness of the camera module 100 can be further reduced.

In at least one alternative embodiment, the annular light guide ring 212 surrounds the bottom of the light guide column 211. In at least one alternative embodiment, the cover plate 40 and the light guide column 211 together close the light-through opening 301. The annular light guide ring 212 and the light incident part 22 can be hidden inside the housing 300, and the user views the camera module 100 from the object side end of the lens assembly 10, the part of the light guide member 20 visible to the user can be reduced, further improving aesthetics.

In at least one alternative embodiment, referring to FIG. 5, FIG. 6, and FIG. 12 to FIG. 15, the cover plate 40 closes the light-through opening 301 of the housing 300. The cover plate 40 is provided over the light guide column 211, with the light-transmitting area of the cover plate 40 corresponding to the incidence opening 20*a*. It is understood that the cover plate 40 can be fixedly assembled with the housing 300. The cover plate 40 can protect the light guide column 211 from wear and scratch on the top surface of the light guide column 211, thus improving the overall appearance of the camera module 100 and the reliability of the light guide column 211, and also reducing the design requirements for the light guide column 211. Both the light guide member 20 and the lens assembly 10 are located inside the housing 300, using the housing 300 to hide the annular light guide ring 212 and the light incident surface 22*a*, avoiding the user to see the annular light guide ring 212 and the light incident surface 22*a* through the cover plate 40, further improving the aesthetics.

The present disclosure is not limited to the material of the light guide member 20, for example, the material of the light guide member 20 includes, but is not limited to, plastic or silicone, etc. Exemplarily, the light guide member 20 includes polycarbonate (PC) substrate or polymethyl methacrylate (PMMA) substrate. PC and PMMA are both transparent plastics, and both have high light transmission and good optical properties. In some embodiments, the light guide member 20 includes a light guide substrate and a light diffusing powder distributed within the light guide substrate. The material of the light guide substrate includes PC and PMMA. The light diffusing powder refers to the material that increases the light scattering and transmitting function, and the light diffusing powder is usually in the form of micro-beads or in the form of microscopic spherical. The light diffusing powder is added to the polycarbonate substrate or the polymethyl methacrylate substrate to further improve the uniformity of light distribution. The mass percentage of the light diffusing powder ranges from 0% to 0.5%. The light enters the light guide member 20 from the light incident surface 22*a* of the light incident part 22, and the mass percentage of the light diffusing powder in the light guide member 20 is 0%, 0.1%, 0.15%, 0.3%, or 0.5%, etc., which not only improves the uniformity of supplementary light, but also improves the appearance uniformity and avoids the phenomenon of uneven light and darkness.

By designing the mass percentage of the light diffusing powder to avoid its concentration within the light guide substrate is too high and reduce the light transmission of the light guide member 20, that is, to ensure that the light guide member 20 has a high light transmission while also having a high ability to scatter light.

In at least one alternative embodiment, referring to FIGS. 7 and 8, the light guide member 20 is a one-piece molded structure, e.g., the light guide member 20 is a one-piece injection molded structure.

In at least one alternative embodiment, referring to FIGS. 7 and 8, the light guide member 20 is a center-symmetrical structure. This improves not only the uniformity of the supplementary light, but also the visual uniformity of appearance.

In at least one alternative embodiment, referring to FIG. 2, FIG. 4 and FIG. 7, the light emitting surface 20*b* is inclined toward the optical axis of the lens assembly 10. In other words, the light emitting surface 20b is roughly trumpet-shaped, in other words, the incidence opening 20a is provided with a shrinking section, a radial size of the shrinking section is gradually decreased from the object side toward the image side, and the side wall of the shrinking section is the light emitting surface 20b of the light guide member 20. In this way, it is easy to emit most of the light into the camera area of the lens assembly 10 and improve the utilization of light.

In at least one alternative embodiment, referring to FIG. 2 and FIG. 7, the camera module 100 includes a light blocking layer or a reflective layer (not shown) provided on the inner peripheral wall of the incidence opening 20a. The light blocking layer blocks the light from the inner peripheral wall of the incidence opening 20a to the lens assembly 10, thus avoiding the flare phenomenon. The reflective layer reflects the light, which increases the uniformity and light output in the light emitting surface 20b.

The specific structure of the light blocking layer is not limited, exemplary, the light blocking layer includes, but is not limited to, the dark ink layer, such as the gray ink layer or the black ink layer, etc.

Figure 16:
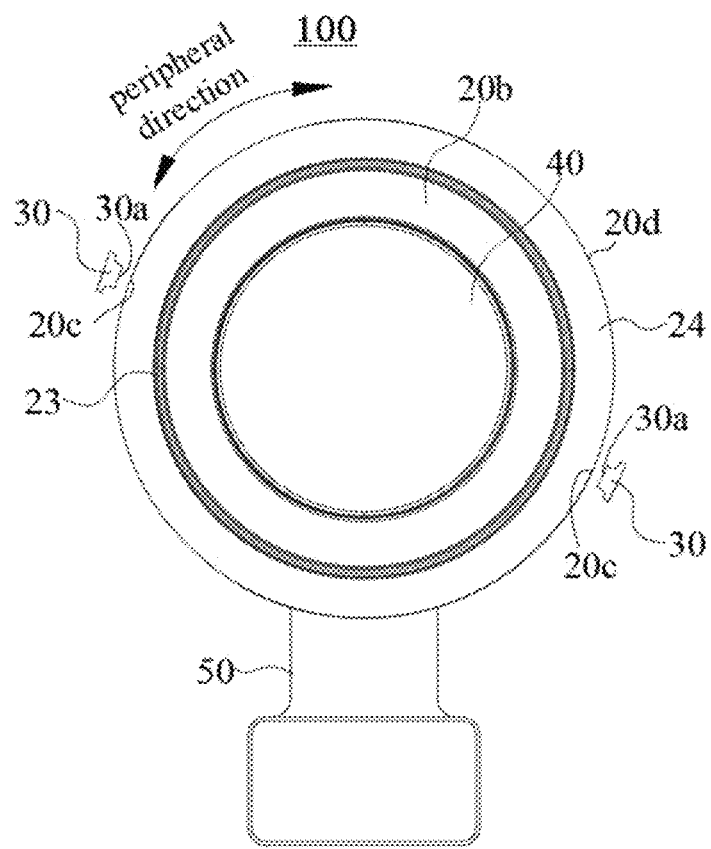
FIG. 16 illustrates a 3D schematic diagram of a camera module according to a second embodiment of the present disclosure.

In a second embodiment of the second light guide member 20, referring to FIG. 16, some areas of the outer peripheral side of the light guide member 20 is formed with a light incident area 20c for light incidence, and the light enters the light guide member 20 from the light incident area 20c along the radial direction of the lens assembly 10. That is to say, the light incident area 20c for light incidence is reserved on the outer peripheral side of the light guide member 20, and the light output surface 30a faces toward the light incident area 20c.

The specific formation method of the light incident area 20c is not limited. For example, referring to FIG. 16, some areas of the outer peripheral side of the light guide member 20 are directly reserved as the light incident area 20c, other areas of the outer peripheral side of the light guide member 20 are subject to reflection processing to form the reflective area 20d. The reflection processing includes but is not limited to coating the reflective layer and so on. In this way, the reflective area 20d of the light guide member 20 can reflect light back into the light guide member 20, and only the light incident area 20c can emit the light.

In a special embodiment, referring to FIG. 16, the light guide member 20 includes a light guide table 23 formed with the incidence opening 20a and an annular skirt 24 surrounding the outer periphery of the light guide table 23. In the height direction (i.e., Z-axis direction) of the light guide member 20, the top surface of the light guide table 23 is higher than the top surface of the annular skirt 24, the light emitting surface 20b is formed on the top surface of the light guide table 23, and the light incident area 20c is formed on the outer peripheral side of the annular skirt 24. The annular skirt 24 surrounds the outer periphery of the light guide table 23. The annular skirt 24 can further scatter light, further avoid the problem of uneven light and shade on the light emitting surface 20b, and further improve the appearance uniformity of the light emitting surface 20b and the uniformity of the supplementary light on the camera area.

In at least one alternative embodiment, please refer to FIG. 16, the annular skirt 24 surrounds the bottom of the light guide table 23. The distance between the annular skirt 24 and the light emitting surface 20b is larger, so as to further improve the appearance uniformity of the light emitting surface 20b and the uniformity of the supplementary light on the camera area.

The specific structure and shape of the light guide table 23 are not limited. In some embodiments, please refer to FIG. 16, the plane perpendicular to the optical axis of the lens assembly 10 is taken as the projection surface, and the projection outer contour of the light guide table 23 is circular, that is, the light guide table 23 is roughly cylindrical.

It can be understood that the light guide table 23 can be understood as the light guide column 211 in the first light guide member 20 provided by the first embodiment, and the annular skirt 24 can be understood as the annular light guide ring 212 in the first light guide member 20 provided by the first embodiment.

The number of the light incident area 20c is unlimited. For example, referring to FIG. 16, the number of the light incident area 20c is a plurality, more the light can enter the light guide member 20, thereby improving the overall brightness. The plurality of light incident areas 20c are evenly spaced along the peripheral direction of the light guide member 20, and the light source 30 and the light incident area 20c are arranged in one-to-one correspondence. In this way, the uniformity of the supplementary light is improved. For example, the number of light incident areas 20c is two, and the two light incident areas 20c are evenly spaced along the peripheral direction of the light guide member 20. In at least one alternative embodiment, the number of the light incident area 20c is one, and the number of the light source 30 is also one. The light emitted by the light source 30 is softer and the light output uniformity is better, which is convenient to ensure the consistency of the light output appearance of the light emitting surface 20b. It should be noted that the plurality in the embodiments of the present disclosure is two or more. For example, the number of the light incident parts 22 is in a range from 2 to 20. In this way, both the uniformity and intensity of the supplementary light can be considered.

As can be understood, the structure, material, etc. of the light guide member 20 provided in the second embodiment can be referred to the light guide member 20 provided in the first embodiment, and will not be repeated here.

In a third embodiment of the third light guide member 20, this embodiment is substantially the same as the light guide member 20 of the first embodiment, the main difference is that the light incident part 22 is located on the image side of the light guide body 21. Both the light incident part 22 and the light guide body 21 are in the shape of a ring. The light incident part 22 and the light guide body 21 are integrally formed. The radial size of the outer contour line of the light incident part 22 is smaller than the radial size of the outer contour line of the light guide body 21. The light incident part 22 has an orthographic projection in the direction of the optical axis within the orthographic projection of the light guide body 21 in the direction of the optical axis. The outer peripheral side of the light incident part 22 is surrounded by the surface of the light guide body 21 toward the image side to define the first installation space 121d. The light source 30 is provided in the first installation space 121d to reduce the space occupied by the camera module 100 as a whole in the radial direction. At least part of the outer peripheral side of the light incident part 22 is the light incident surface 22a. The outer peripheral side of the light incident part 22 is a side along the Z-axis direction. The number of the light source 30 is a plurality, and the plurality of light sources 30 are provided around the outer peripheral side of the light incident part 22.

Figure 17:
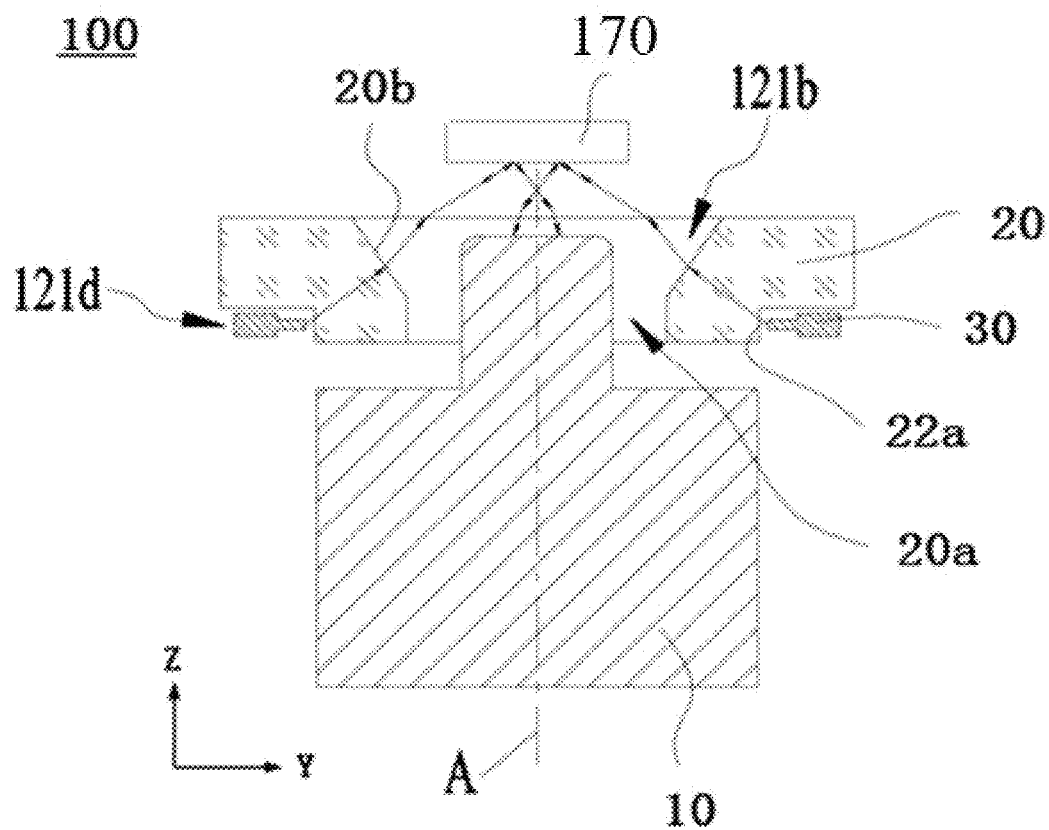
FIG. 17 illustrates a first sectional view of a camera module according to a third embodiment of the present disclosure.

Referring to FIG. 17, the light guide member 20 is provided with an incidence opening 20a, and a first installation space 121*d* provided on the peripheral side of the incidence opening 20*a*. The first installation space 121*d* may be annular in shape. The end of the lens assembly 10 close to the object side is inserted in the incidence opening 20*a*, which is equivalent to the light guide member 20 being sleeved on the outer peripheral side of the lens assembly 10. The first installation space 121*d* is provided on the peripheral direction of the incidence opening 20*a*, and the light source 30 is provided in the first installation space 121*d*, which is equivalent to the light source 30 being hidden in the light guide member 20, and the light from the light source 30 is directed to the field of view of the lens assembly 10 through the light guide member 20.

The mobile terminal 1000 provided in the embodiment of the present disclosure, by inserting the end of the lens assembly 10 close to the object side in the incidence opening 20*a* of the light guide member 20, and by setting the light source 30 in the first installation space 121*d* of the light guide member 20, it is possible to make the light from the light source 30 be directed to the field of view of the lens assembly 10 from all around the lens assembly 10, whereby it is possible to provide sufficient light to the field of view of the lens assembly 10 in the close-up shooting mode, and thus, the photographed object in the field of view can be clearly photographed.

In addition, setting the light source 30 in the first installation space 121*d* of the light guide member 20 not only facilitates light guidance, but also enables the overall structure of the camera module 100 to be more compact.

Figure 18:
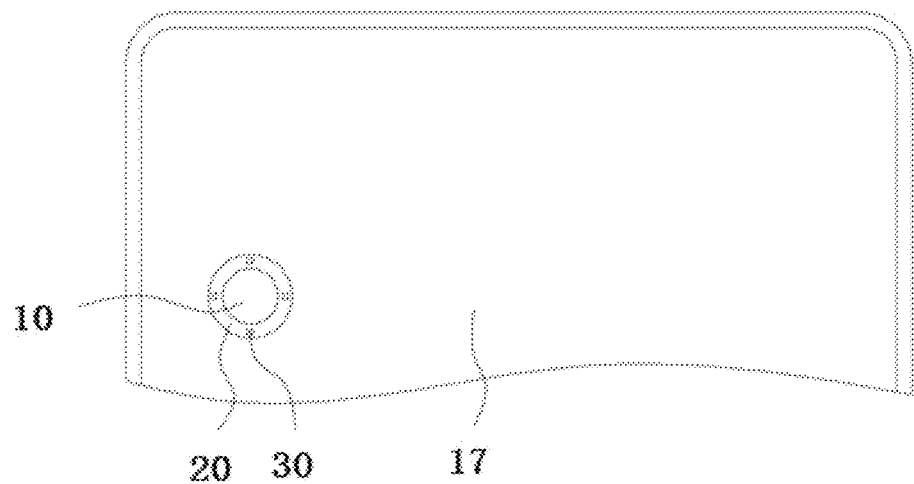
FIG. 18 illustrates a partially schematic structural diagram of a mobile terminal according to an embodiment of the present disclosure.

Referring to FIG. 18, the light guide member 20 of the embodiment of the present disclosure is a continuous annular structure, specifically, the light guide member 20 of the embodiment in the present disclosure is circular in shape. In order to improve the uniformity of the supplementary light, the embodiment of the present disclosure provides a plurality of light sources 30, the plurality of light sources 30 along the peripheral direction of the light guide member 20 spaced, the included angle of the adjacent two of the light sources 30 can be the same, or can be different.

It is understood that the light guide member 20 in the present disclosure is not limited to a circular shape, in other embodiments, the outer ring of the annular light guide member 20 can also be rectangular, triangular, oval, special-shaped, etc., and the inner ring can be any one of circular, rectangular, triangular, oval, special-shaped, etc., that is, the outer ring and the inner ring of the annular light guide member 20 can be the same shape, or different shapes, without limitation here.

Referring to FIG. 17, the light guide body 21 includes a first surface 201 and a second surface 202 disposed back-to-back. An end of the incidence opening 20*a* has a first opening in the first surface 201, and another end of the incidence opening 20*a* has a second opening in the second surface 202. The incidence opening 20*a* has at least a shrinking section 121*b*, and the radial size of the shrinking section 121*b* is gradually decreased from the end where the first opening is located (i.e., the side where the first surface 201 is located, i.e., the object side) toward the end where the second opening is located (i.e., the side where the second surface 202 is located, i.e., the image side), and the first installation space 121*d* is located on the peripheral direction of the incidence opening 20*a* close to the end of the second opening. In other words, the hole size of the side of the shrinking section 121*b* close to the first opening is larger than that of the side of the shrinking section 121*b* far away from the first opening, whereby it is possible to facilitate the light reflected on the photographed object 170 to be shot onto the lens assembly 10 for final imaging when the lens assembly 10 is shooting.

The first installation space 121*d* is located on the side of the incidence opening 20*a* close to the second surface 203.

In this embodiment, the incidence opening 20*a* has a shrinking section 121*b* and a straight section, the straight section is connected to the end of the shrinking section 121*b* far away from the first opening, the first opening of the incidence opening 20*a* corresponds to the opening of the shrinking section 121*b*, and the second opening corresponds to the opening of the straight section, and the first installation space 121*d* is actually located on the peripheral side of the straight section. In other embodiments, the straight section may also be connected to the end of the shrinking section 121*b* far away from the second opening, or, alternatively, both ends of the shrinking section 121*b* may be provided with straight section. In other embodiments, the shrinking section 121*b* may also be provided without the straight section.

Referring to FIG. 17, in the embodiment of the present disclosure, the side wall of the shrinking section 121*b* is the light emitting surface 20*b* of the light guide member 20. i.e., after the light emitted by the light source 30 enters the light guide member 20 from the light incident surface 22*a* of the light guide member 20, it can exit from the side wall of the shrinking section 121*b* and be directed to the field of view of the lens assembly 10, which is equivalent to the incidence opening 20*a* being both the shooting hole of the lens assembly 10 and the light emitting hole of the camera module 100, thereby ensuring that the relative illumination in the field of view of the lens assembly 10 can meet the shooting requirements when the lens assembly 10 is shooting, especially at close range.

The light emitted from the light source 30 in this embodiment is mainly transmitted along a straight path from the light incident surface 22*a* of the light guide member 20 to the light emitting surface 20*b* of the light guide member 20. In other embodiments, the light emitted from the light source 30 may also enter the interior of the light guide member 20 from the light incident surface 22*a* of the light guide member 20 and then be reflected several times in the light guide member 20 before being transmitted to the light emitting surface 20*b* of the light guide member 20.

It is understood that in other embodiments, it is also possible to provide a separate light emitting hole at the outer periphery of the incidence opening 20*a*, and the light guided by the light guide member 20 emit to the field of view through the light emitting hole, i.e., the incidence opening 20*a* is used only as the shooting hole of the lens assembly 10, and the light guided by the light guide member 20 does not pass through the incidence opening 20*a*.

The side wall of the shrinking section 121*b* may also not be the light emitting surface, for example, in other embodiments, the end surface (i.e., the first surface 201) of the side of the light guide member 20 provided with the first opening may can be used as the light emitting surface.

Referring to FIG. 17, in the embodiment of the present disclosure, a part of the end surface (i.e., the second surface 202) having the second opening is recessed in the direction of the end surface (i.e., the first surface 201) having the first opening to define the first installation space 121*d*. In other embodiments, it may also be that a part of the side wall of the light guide member 20 is recessed in the direction close to the incidence opening 20*a* to define the first installation space 121*d*, in addition, the first installation space 121*d* can be provided inside the light guide member 20. That is, the first installation space 121d passes through the second surface 202 and/or the first peripheral side 203.

Referring to FIG. 17, the light incident surface 22a of the light guide member 20 in the embodiment of the present disclosure is located on the side of the first installation space 121d close to the incidence opening 20a. Specifically, the light incident surface 22a of the embodiment is parallel to the optical axis A of the lens assembly 10, thereby facilitating both the arrangement of the light source 30 in the first installation space 121d and the directing of light from the light incident surface 22a to the side wall of the shrinking section 121b.

In other embodiments, the light incident surface 22a may also not be parallel to the optical axis A of the lens assembly 10. For example, the light incident surface 22a may have an angle of less than 90° with the optical axis A.

In addition, since the light guide member 20 is made of the light-transmitting material, in order to avoid the user seeing the internal structure of the mobile terminal 1000 through the light guide member 20, the end face of the light guide member 20 with the second opening can be set as an opaque surface, and the second surface 202 is the opaque surface. For example, the end surface of the light guide member 20 with the second opening can be atomized to achieve a frosted effect.

Figure 19:
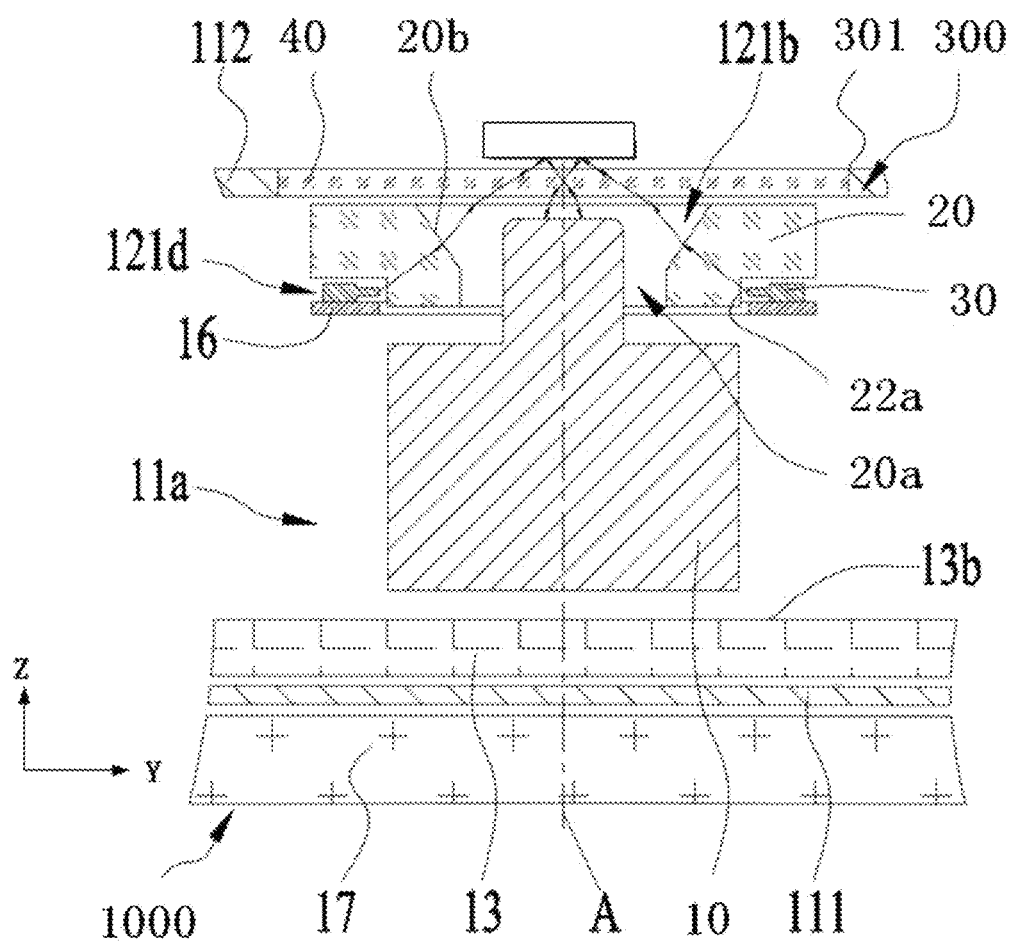
FIG. 19 illustrates a second sectional view of a camera module according to the third embodiment of the present disclosure.

Another embodiment of the present disclosure provides a mobile terminal 1000, referring to FIG. 19, the mobile terminal 1000 of the embodiment of the present disclosure includes a housing 300, a main board 13 and a camera module 100 provided in the above embodiment. The housing 300 includes a front housing 111 and a rear cover 112, an accommodation cavity is defined between the front housing 111 and the rear cover 112. The main board 13 is provided in the accommodation cavity, and a second installation space 11a is defined between the main board 13 and the rear cover 112, and a surface of the main board 13 close to the side of the second installation space 11a is a third surface 13b. The camera module 100 is provided in the second installation space 11a, and an end of the lens assembly 10 close to the main board 13 is in contact with the third surface 13b; or, an end of the lens assembly 10 close to the main board 13 is spaced apart from the third surface 13b. In other words, the lens assembly 10 is only disposed on a side of the main board 13, and the main board 13 does not have a corresponding avoidance structure such as an avoidance opening for the lens assembly 10, thereby, when setting the lens assembly 10, it will not damage the original structure of the main board 13, and thus, will not affect the alignment of main board 13 and the setting of related components.

Referring to FIG. 19, the mobile terminal 1000 of the embodiment of the present disclosure further includes a flexible circuit board 16, and the light source 30 is disposed on the flexible circuit board 16, specifically, the light source 30 can be soldered on the flexible circuit board 16, and the flexible circuit board 16 is electrically connected to the main board 13. Since there is a certain interval between the light source 30 and the main board 13, the light source 30 can be easily electrically connected to the main board 13 by providing the flexible circuit board 16.

It can be understood that in other embodiments, it is also possible to not provide the flexible circuit board 16, and the light source 30 is directly electrically connected to the main board 13.

Referring to FIG. 19, in at least one alternative embodiment, the mobile terminal 1000 further includes a cover plate 40 located at the end of the camera module 100 close to the object side, and the cover plate 40 in this embodiment may refer to the cover plate in the first light guide member 20 of the first embodiment. The light from the light guide member 20 is directed to the field of view of the lens assembly 10 after passing through the cover plate 40, and the light reflected from the photographed object is also directed to the lens assembly 10 after passing through the cover plate 40 to achieve the final image.

The cover plate 40 covers the light-through opening 301. The cover plate 40 can be directly arranged on the rear cover 112, or a decorative cover can be arranged on the rear cover 112, and the cover plate 40 can be arranged on the decorative cover. When the cover plate 40 is arranged on the decorative cover, a flange can be formed on the outer surface of the light guide member 20, and the decorative cover is pressed against the flange to play the role of fixing the decorative cover and the light guide member 20.

Figure 20:
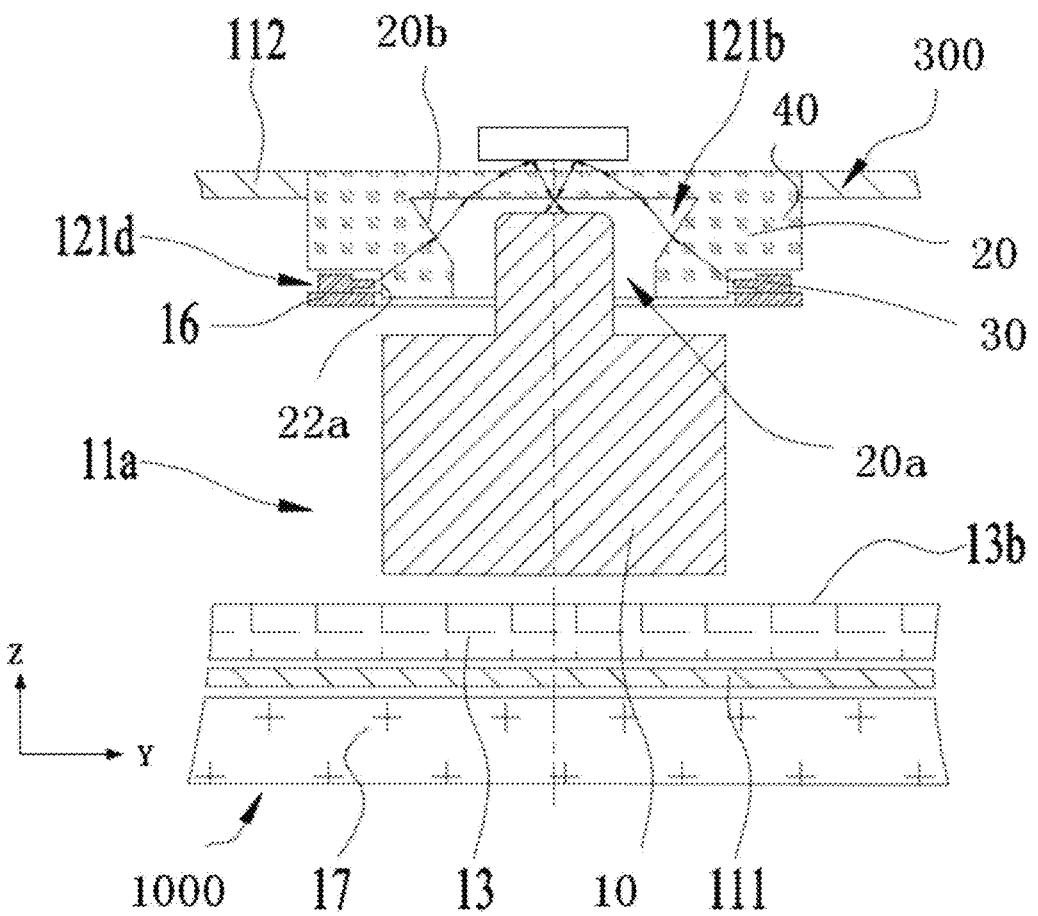
FIG. 20 illustrates a sectional view of another camera module according to the third embodiment of the present disclosure.

In the embodiment of the present disclosure, the cover plate 40 and the light guide member 20 are two separate structures. Referring to FIG. 20, in an alternative embodiment, the cover plate 40 may also be integrally formed with the light guide member 20, i.e., a part of the light guide member 20 may be used as the cover plate 40, whereby the overall thickness of the phone can be further reduced.

Referring to FIG. 21, in one embodiment, the lens assembly 10 is a functional camera, and the mobile terminal 1000 further includes a main camera 14 disposed in a second installation space 11a, and the main board 13 is provided with an avoidance opening 13a, and the end of the main camera 14 close to the main board 13 is penetrated into the avoidance opening 13a. That is, in the embodiment, both the main camera 14 and the functional camera are provided on the mobile terminal 1000, and in one embodiment, the functional camera may be a camera capable of imaging at a working distance in the ultra-macro range, and the ultra-macro range is 3 mm to 10 mm, i.e., the functional camera may be an ultra-macro camera, and in other embodiments, the functional camera may be a macro camera, a wide-angle camera, a telephoto camera, and so on.

Specifically, the overall size of the main camera 14 is generally larger than that of the functional camera, and in order to ensure that the mobile terminal 1000 can be as thin and light as possible, this embodiment provides the avoidance opening 13a for the main camera 14 on the main board 13, and the end of the main camera 14 close to the main board 13 is penetrated into the avoidance opening 13a to reduce the space occupied by the main camera 14 in the direction of the thickness of the phone. At the same time, the end of the function camera close to the rear cover 112 is penetrated into incidence opening 20a of the light guide member 20, thus, it is possible not to increase the own thickness of the mobile terminal 1000 at the same time, neither in the main board 13 for the function camera to open the corresponding avoidance hole and other avoidance structure, but also to ensure that the function camera in the close shooting mode can provide sufficient light for the field of view of the function camera.

Figure 22:
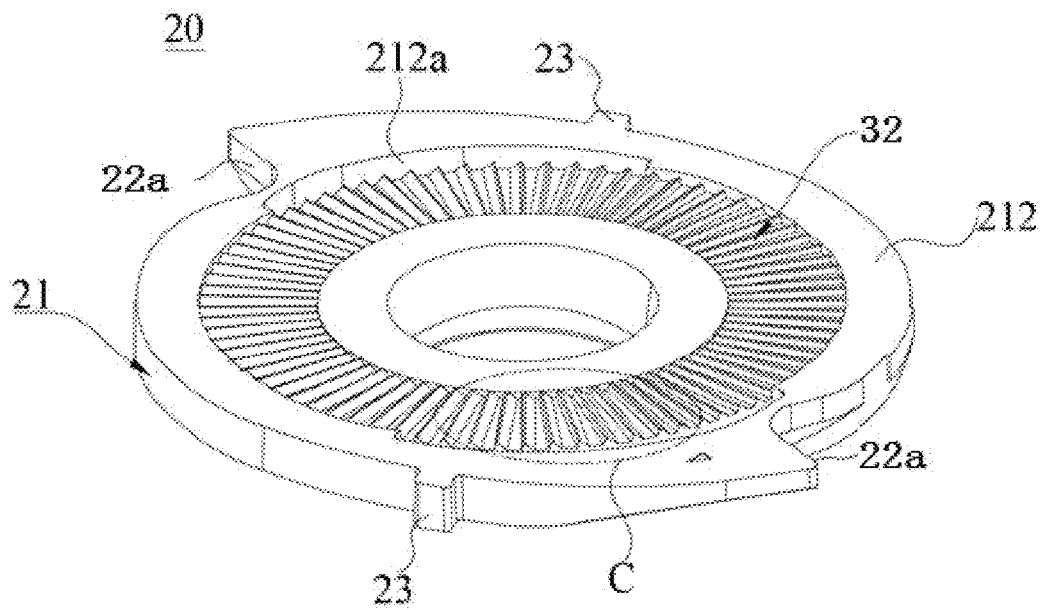
FIG. 22 illustrates a second schematic structural diagram of the second light guide member illustrated in FIG. 9.

Referring to FIG. 22, the light guide member 20 is provided in conjunction with any of the above embodiments. the second surface 202 of the light guide body 21 is provided with a scattering structure 32. The light is scattered by the scattering structure 32 and emitted from the light emitting surface 20b to the camera area of the lens assembly 10. The plane perpendicular to the optical axis of the lens assembly 10 is used as the projection plane, and the projection of the light emitting surface 20b is located within the projection of the scattering structure 32. The orthographic projection of the light emitting surface 20b in the direction of the optical axis is located in the area where the scattering structure 32 is located.

In the camera module 100 of the present disclosure, the light is scattered by the scattering structure 32 and then emitted from the light emitting surface 20b to the camera area of the lens assembly 10, thereby improving the illumination of the photographed object and achieving supplementing light. The imaging light reflected from the photographed object enters the lens assembly 10 through the incidence opening 20a, the lens assembly 10 can complete the photography. The projection of the light emitting surface 20b is located within the projection range of the scattering structure 32 to ensure that the light emitted from the light emitting surface 20b is scattered by the scattering structure 32, and the light can avoid too concentrated, thereby avoiding the phenomenon of uneven light and darkness on the light emitting surface 20b, which not only improves the appearance uniformity of the light emitting surface 20b after lighting, but also improves the uniformity of the supplementary light to the camera area.

It should be noted that the appearance uniformity of the light emitting surface 20b is the brightness consistency of the light emitting surface 20b after the light guide member 20 is lit.

Figure 23:
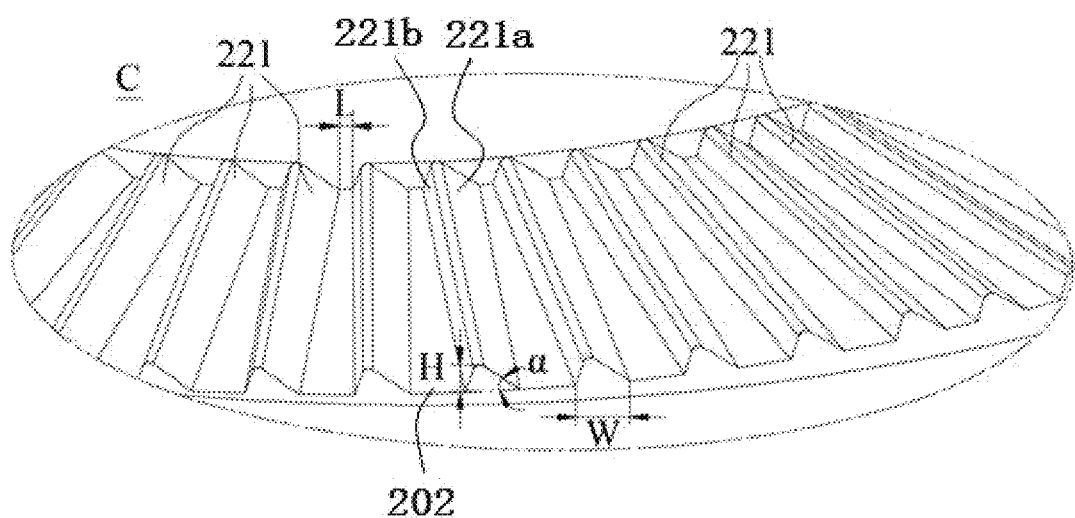
FIG. 23 illustrates a partially enlarged schematic diagram of the second light guide member illustrated in FIG. 22.

In at least one alternative embodiment, referring to FIG. 22 and FIG. 23, the scattering structure 32 includes a plurality of sawteeth 221 spaced along the peripheral direction of the lens assembly 10, the sawteeth 221 extend along the radial direction of the lens assembly 10. The sawteeth 221 change the direction of light propagation, allowing light to be dispersed and distributed to improve the uniformity of light distribution.

To further improve the uniformity of light distribution and the appearance uniformity of the light emitting surface 20b, in at least one alternative embodiment, referring to FIG. 23, the sawtooth 221 includes a first inclined surface 221a and a second inclined surface 221b connected to the bottom surface of the light guide body 21 (the surface of the light guide body 21 facing toward the image side), the first inclined surface 221a and the second inclined surface 221b are relatively inclined and connected, that is, the two relatively inclined and connected inclined surfaces 221a, 221b together form the sawtooth 221. The included angle between the first inclined surface 221a and the bottom surface of the light guide body 21 (the second surface 202, which is also the surface of the light guide body 21 facing toward the image side) is in a range from 30° to 45°. Exemplarily, the included angle α between the first inclined surface 221a and the second surface 202 (the surface of the light guide body 21 facing toward the image side) is 30°, 35°, 40° or 45°, etc. In this way, the light is projected onto the first inclined surface 221a and is changed its propagation direction via the first inclined surface 221a. The included angle between the second inclined surface 221b and the second surface 202 is in a range from 70° to 85°. Exemplarily, the included angle between the second inclined surface 221b and the second surface 202 is 70°, 75°, 80° or 85°, etc. In this way, the light is projected onto the second inclined surface 221b and is changed its propagation direction via the second inclined surface 221b.

In other words, when the second surface 202 is not provided with the sawteeth 221, the light is reflected back and forth between the first surface 201 and the second surface 202, and the light is conducted forward around the incidence opening 20a in the process of reflection. By setting the sawteeth 221 on the second surface 202, the light is reflected back and forth between the first surface 201 and the sawteeth 221, and the first inclined surface 221a and the second inclined surface 221b of the sawtooth 221 make the direction of light fold back and reflect, thus the light is continuously folded back in the light guide body 21 under the action of the sawteeth 221, and the conduction direction is continuously disrupted, and after several reflections, the light is evenly distributed in the light guide body 21.

In at least one alternative embodiment, referring to FIG. 23, the highest height of the sawtooth 221 is in a range from 0.1 mm to 0.25 mm. In other words, the size of the sawtooth 221 along the optical axis of the lens assembly 10 is in a range from 0.1 mm to 0.25 mm. Exemplarily, the maximum height H of the sawtooth 221 is 0.1 mm, 0.15 mm, 0.2 mm, or 0.25 mm, etc. When the height of the sawtooth 221 is too small, it is not easy to shape and cannot play a good role in scattering light; when the height of the sawtooth 221 is too high, the scattering effect for light is relatively poor; thus, this implementation can ensure that the sawteeth 221 can effectively scatter light by designing the height of the sawtooth 221, but also can avoid the sawteeth 221 in the height direction are too high, occupying too much space.

In at least one alternative embodiment, referring to FIG. 23, the maximum width of the sawtooth 221 is in a range from 0.1 mm to 0.4 mm. In other words, the size of the sawtooth 221 along the peripheral direction of the light guide member 20 is in a range from 0.1 mm to 0.4 mm. Exemplarily, the maximum width W of the sawtooth 221 is 0.1 mm, 0.15 mm, 0.2 mm, 0.25 mm, 0.3 mm, 0.35 mm or 0.4 mm, etc. In this way, it can not only ensure that the sawteeth 221 can effectively scatter the light, but also prevent a single sawtooth 221 from occupying too much of the area of the bottom surface of the light guide member 20, which is convenient to adjust the number of the sawteeth 221 and distribution density of the sawteeth 221.

The specific shape of the light emitting surface 20b is not limited, in at least one alternative embodiment, please refer to FIG. 9 and FIG. 10, with the plane perpendicular to the optical axis of the lens assembly 10 as the projection plane, the projection profile of the light emitting surface 20b is a circular shape, and the projection profile of the scattering structure 32 also has a roughly circular shape.

Referring to FIG. 9, the scattering structure 32 is provided on the bottom surface (i.e., the second surface 202) of the light guide column 211, and the light can be directed to the scattering structure 32 after entering the annular light guide ring 212 from the light incident surface 22a.

Referring to FIG. 9, the minimum distance between two adjacent sawteeth 221 close to the light incident surface 22a is greater than the minimum distance between two adjacent sawteeth 221 far away from the light incident surface 22a, along the preset rotation direction, where the preset rotation direction and the direction of the light emitted from the light emitting surface 20b conform to the right-hand spiral rule. That is: the right hand holds the annular light guide ring 212, the right thumb points to the direction of light emitted from the light emitting surface 20b, the four fingers of the right hand start from the light incident surface 22a, and the direction of bending of the four fingers of the right hand is the preset rotation direction.

With the light incident surface 22a as the starting point, the light enters the light incident surface 22a, that is, the position close to the light incident surface 22a has more light, therefore, along the preset rotation direction, the minimum distance between two adjacent sawteeth 221 close to the light incident surface 22a is larger, the distribution of the sawteeth 221 is sparser, and the density of the sawteeth 221 is smaller to avoid scattering too much light from the sawteeth 221 to the light emitting surface 20b. The minimum distance between the two adjacent serrations 221 far away from the light incident surface 22a is smaller, the distribution of the sawteeth 221 is denser, and the density of the sawteeth 221 is higher, and thus the light far away from the light incident surface 22a can be scattered by the sawteeth 221 towards the light emitting surface 20b, it is convenient for the light far away from the light incident surface 22a to be scattered by the sawteeth 221 to the light emitting surface 20b, so as to improve the brightness of the part far from the light emitting surface 20b, and improve the appearance uniformity of the light emitting surface 20b after lighting.

In other words, along the peripheral direction of the light guide member 20, the density of the sawteeth 221 close to the light incident surface 22a is less than the density of the sawteeth 221 far away from the light incident surface 22a. In at least one alternative embodiment, the sawteeth 221 close to the light incident surface 22a are the sawteeth 221 corresponding to the light incident peripheral side 22b of the light incident part 22. The spacing between two adjacent sawteeth 221 in this area may be equal, or the density of the sawteeth 221 may be gradually increased along the decreasing rotation of the light incident part 22. The sawteeth 221 far away from the light incident surface 22a are the sawteeth 221 un-corresponding to the light incident peripheral side 22b of the light incident part 22. The spacing between the two adjacent sawteeth 221 in this area may be equal, or the density may be gradually increased along the decreasing rotation upward of the light incident part 22.

The embodiment by designing the structure of wedge-shaped sawteeth 221 on the back of the light guide body 21, the arrangement density of the structure of the wedge-shaped sawteeth 221 is relatively small at the position of a lamp port (i.e., the light output surface) of the light source 30, but gradually increases at the position far away from the lamp port, so as to improve the light guide brightness at the position far away from the lamp port and improve the appearance uniformity after lighting.

To further facilitate light propagation, in at least one alternative embodiment, referring to FIG. 9, the minimum distance between two adjacent sawteeth 221 close to the light incident surface 22a is in a range from 0.05 mm to 0.07 mm in the preset rotation direction (along the peripheral direction of the light guide member 20). In other words, the minimum distance between two adjacent sawteeth 221 close to the light incident surface 22a along the peripheral direction of the light guide member 20 (the distance close to the incidence opening 20a) is in the range from 0.05 mm to 0.07 mm. Exemplarily, the minimum distance L between the two adjacent sawteeth 221 close to the light incident surface 22a is 0.05 mm, 0.055 mm, 0.06 mm, 0.065 mm, or 0.07 mm, etc.

In order to further facilitate the light from the part far away from the light incident surface 22a to be scattered by the sawteeth 221 emits the light emitting surface 20b, in at least one alternative embodiment, referring to FIG. 9, the minimum distance between two adjacent sawteeth 221 far away from the light incident surface 22a is in a range from 0.01 mm to 0.03 mm in the preset rotation direction (along the peripheral direction of the light guide member 20). In other words, the minimum distance between the two adjacent sawteeth 221 far away from the light incident surface 22a in the peripheral direction of the light guide member 20 (the distance close to the incidence opening 20a) is in the range from 0.01 mm to 0.03 mm. Exemplarily, the minimum distance L between two adjacent sawteeth 221 far away from the light incident surface 22a is 0.01 mm, 0.015 mm, 0.02 mm, 0.025 mm, or 0.03 mm, etc.

The scattering structure 32 is disposed on the light guide body 21. The light guide body 21 is further provided with at least one isolation groove 212a disposed between the scattering structure 32 and the light incident part 22. Setting the isolation groove 212a on the position of the light guide body 21 where the light incident part 22 is located, which can act as a light stopper to further reduce the degree of light exposing at the location of the light incident part 22.

In at least one alternative embodiment, referring to FIG. 9, the bottom surface of the annular light guide ring 212 is formed with the isolation groove 212a located at the location of the light incident part 22, and the isolation groove 212a is located on the radially outer side of the scattering structure 32. In other words, with the plane perpendicular to the optical axis of the lens assembly 10 as the projection plane, at least part of the projection of the isolation groove 212a is located between the projection of the light incident part 22 and the projection of the light emitting surface 20b, since the annular light guide ring 212 where the light incident part 22 is located has higher brightness, the phenomenon of lamp exposing is easy to occur, the isolation groove 212a can reduce the light at the location of the light incident part 22 directly into the light guide column 211 where the light incident part 22 is located and play a role in stopping the light, the brightness of the part of the light emitting surface 20b close to the light incident part 22 is balanced with the brightness of the part of the light emitting surface 20b far away from the light incident part 22, thereby improving the appearance uniformity of the light emitting surface 20b and the uniformity of the supplementary light to the camera area.

Figure 14:
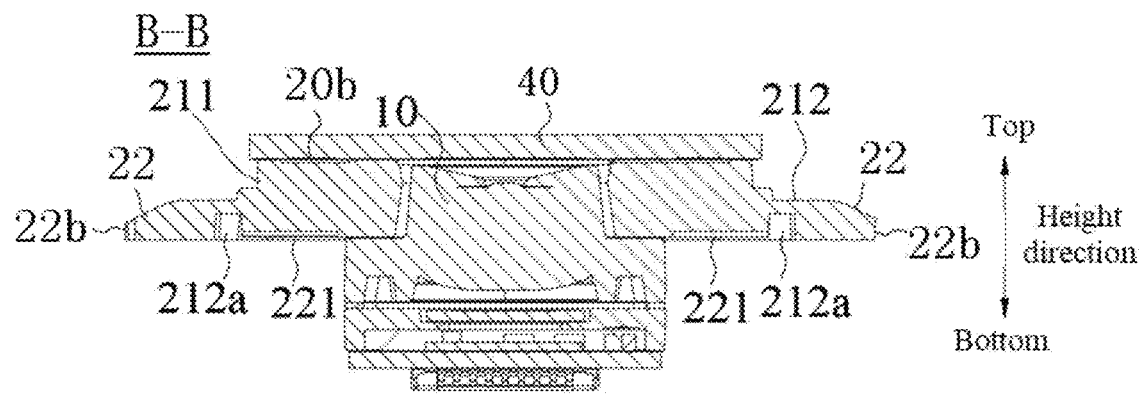
FIG. 14 illustrates a sectional view of the camera module illustrated in FIG. 13 along a line B-B.

In a specific embodiment, referring to FIG. 9 and FIG. 14, the bottom surface of the annular light guide ring 212 is recessed toward the top side to define the isolation groove 212a.

The profile of the isolation groove 212a is to fit the profile of the light guide column 221, specifically, the isolation groove 212a is located on the radially outer side of the scattering structure 32 and extends in an arc along the peripheral direction of the light guide member 20 to ensure that the light is not affected when it is transmitted to the far end and to ensure the brightness of the area far away from the lamp port is uniform with the brightness of the area close to the lamp port.

Figure 15:
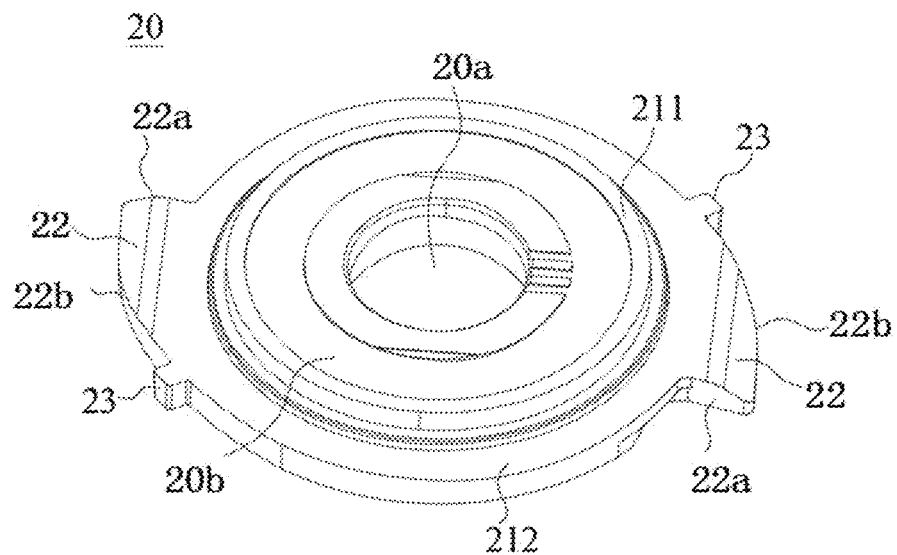
FIG. 15 illustrates a partially schematic structural diagram of the camera module illustrated in FIG. 12.

In at least one alternative embodiment, referring to FIGS. 9, 10 and 15, the light guide member 20 includes at least one positioning structure 23 provided on the outer peripheral side of the annular light guide ring 212. The mobile terminal 1000 is provided with a limiting structure adapted to the shape of the positioning structure 23, and the positioning structure 23 is inserted into the limiting structure to position the camera module 100 for assembly to the mobile terminal 1000. The positioning structure is spaced from the light incident part.

The specific structure of the positioning structure 23 is not limited, exemplarily, the positioning structure 23 is a protuberance and the limiting structure is a groove adapted to the shape of the protuberance. In at least one alternative embodiment, the positioning structure 23 is a groove and the limiting structure is a protuberance shaped to fit the groove. The protuberance is inserted into the groove to position the camera module 100 for assembly to the mobile terminal 1000.

To improve the visual symmetry of the appearance of the light guide member 20, in at least one alternative embodiment, referring to FIGS. 9, 10 and 15, the number of positioning structures 23 is a plurality, and the plurality of positioning structures 23 are spaced along the peripheral direction of the annular light guide ring 212, for example, the plurality of positioning structures 23 are evenly spaced. Exemplarily, the number of the positioning structures 23 are two, and the two positioning structures 23 are evenly spaced along the peripheral direction of the annular light guide ring 212.

The above is some of the embodiments of the present disclosure. It should be pointed out that for those skilled in the art, certain improvements and embellishments can be made without departing from the principles of the present disclosure. These improvements and embellishments are also considered as the protection scope of the present disclosure.

What is claimed is:

1. A camera module, comprising:
a lens assembly;
a light guide member, being of an annular structure as a whole, wherein the light guide member is sleeved on an outer peripheral side of the lens assembly; and
a light source, wherein light emitted by the light source is incident in the light guide member from an outer peripheral side of the light guide member and is emitted out through a light emitting surface of the light guide member, and the light emitting surface faces toward an object side of the lens assembly;
wherein the light guide member comprises a light guide body and a light incident part, the light guide body is sleeved on the outer peripheral side of the lens assembly, the light incident part is disposed on an outer peripheral side of the light guide body or on an image side of the light guide body, the light incident part is provided with a light incident surface for the light emitted by the light source to enter, and the light emitting surface is disposed on the light guide body;
wherein a surface of the light guide member facing toward the image side is provided with a scattering structure; the light emitted by the light source is scattered by the scattering structure and then emitted from the light emitting surface to a camera area of the lens assembly; an orthographic projection of the light emitting surface in a direction of an optical axis of the lens assembly is located in an area where the scattering structure is located;
wherein when the light incident part is disposed on the outer peripheral side of the light guide member, the scattering structure is disposed on the light guide member; the light guide body is further provided with at least one isolation groove disposed between the scattering structure and the light incident part, and
wherein the at least one isolation groove extends in an arc along a peripheral direction of the light guide member.

2. The camera module according to claim 1, wherein the light incident part is disposed on the outer peripheral side of the light guide member, and the light incident surface gradually extends outward from the outer peripheral side of the light guide body along a direction far away from the optical axis of the lens assembly.

3. The camera module according to claim 2, wherein one of the following:
a plane perpendicular to the optical axis of the lens assembly is taken as a projection plane, a projection line of the light incident surface on the projection plane is connected with a projection outer contour edge line of the light emitting surface on the projection plane;
a plane perpendicular to the optical axis of the lens assembly is taken as a projection plane, a distance between a center point of a projection line of the light incident surface on the projection plane and a projection outer contour edge line of the light emitting surface on the projection plane is at a range from 2.5 mm to 4.0 mm;
the light incident part is further provided with a light incident peripheral side, an end of the light incident peripheral side is connected to the light incident surface, another end of the light incident peripheral side is gradually far away from the light incident surface and connected to the outer peripheral side of the light guide body; the light incident peripheral side is a convex arc surface, and the light incident peripheral side and the outer peripheral side of the light guide body are smoothly transited; and
the light source is provided with a light output surface capable of emitting the light, the light output surface faces toward the light incident surface, a distance between the light output surface and the light incident surface is gradually increased along the direction far away from the optical axis of the lens assembly, and an included angle between a plane where the light output surface is located and a plane where the light incident surface is located is at a range from 0 degrees (°) to 20°.

4. The camera module according to claim 2, wherein a plane perpendicular to the optical axis of the lens assembly is taken as a projection plane, an included angle between a projection line of the light incident surface on the projection plane and a reference radial direction of the lens assembly is at a range from 0° to 10°, and the reference radial direction is a radial direction of a projection point formed on the projection plane through an edge of the light incident surface far away from the outer peripheral side of the light guide body; and
wherein the light guide body comprises a light guide column and an annular light guide ring surrounding an outer periphery of the light guide column; a surface of the light guide column facing toward the object side is a first subsurface, a surface of the annular light guide ring facing toward the object side is a second subsurface, the first subsurface is close to the object side relative to the second subsurface, and at least part of the first subsurface forms the light emitting surface, the light incident part is disposed on an outer peripheral side of the annular light guide ring.

5. The camera module according to claim 4, wherein a surface of the light guide column facing toward the image side is a third subsurface, a surface of the annular light guide ring facing toward the image side is a fourth subsurface; and the fourth subsurface is located between a plane where the first subsurface is located and a plane where the third subsurface is located, or, the fourth subsurface is coplanar with the third subsurface.

6. The camera module according to claim 1, wherein the light incident part is disposed on the image side of the light guide body, a radial size of an outer contour line of the light incident part is smaller than a radial size of an outer contour line of the light guide body, an outer peripheral side of the light incident part and a surface of the light guide body facing toward the image side define a first installation space, the light source is disposed in the first installation space, and at least part of the outer peripheral side of the light incident part is the light incident surface; and
wherein an orthographic projection area of the light emitting surface in a direction of an optical axis of the lens assembly is separated from an orthographic projection area of an inner wall of the first installation space in the direction of the optical axis of the lens assembly.

7. The camera module according to claim 1, wherein the light guide member is provided with an incidence opening, an object side end of the lens assembly is disposed in the incidence opening, the incidence opening is provided with a shrinking section, a radial size of the shrinking section is gradually decreased from the object side to an image side, and a side wall of the shrinking section is the light emitting surface of the light guide member; or
wherein at least one of at least part of a surface of the light guide member facing toward an image side, a part of the outer peripheral side of the light guide member, and a part of the light guide member facing toward the object side is provided with one of a reflective layer and a light shading layer.

8. The camera module according to claim 1, wherein one or more of the following:
the light incident part comprises a plurality of light incident parts, the plurality of light incident parts are arranged at intervals along a peripheral direction of the light guide body, and light sources and the plurality of light incident parts are arranged in one-to-one correspondence; and
the light guide member further comprises at least one positioning structure disposed on the outer peripheral side of the light guide body, the positioning structure and the light incident part are arranged at intervals; when the number of the at least one positioning structures is a plurality, the plurality of positioning structures are spaced along a peripheral direction of the light guide body.

9. The camera module according to claim 1, wherein an object side end of the lens assembly is disposed in an incidence opening of the light guide member, the camera module further comprises a cover plate disposed on the object side of the lens assembly, the cover plate closes the incidence opening, the cover plate is provided with a viewing area and an annular light shading area surrounding an outer periphery of the viewing area, and a light transmittance of the viewing area is greater than a light transmittance of the annular light shading area; a plane perpendicular to an optical axis of the lens assembly is taken as a projection plane, a projection of a lens in the lens assembly is located in a projection of the viewing area; and
wherein an inner peripheral wall surface of the incidence opening is provided with a step surface, and the cover plate is supported on the step surface; and/or, the cover plate and the light guide member are integrally formed; and/or, the camera module further comprises one of a light blocking layer and a reflective layer disposed on the inner peripheral wall surface of the incidence opening.

10. The camera module according to claim 1, wherein the scattering structure comprises a plurality of sawteeth spaced along a peripheral direction of the lens assembly, and the plurality of sawteeth extend along a radial direction of the lens assembly.

11. The camera module according to claim 10, wherein one or more of the following:
each of the plurality of sawteeth comprises a first inclined surface and a second inclined surface, which are connected with the surface of the light guide member facing toward the image side, the first inclined surface and the second inclined surface are relatively inclined and connected to each other, an included angle between the first inclined surface and the surface of the light guide member facing toward the image side is at a range from 30° to 45°, and an included angle between the second inclined surface and the surface of the light guide member facing toward the image side is at a range from 70° to 85°;
a size of each of the plurality of sawteeth along a direction of the optical axis of the lens assembly is at a range from 0.1 mm to 0.25 mm; and
a size of each of the plurality of sawteeth along the peripheral direction of the light guide member is at a range from 0.1 mm to 0.4 mm.

12. The camera module according to claim 10, wherein in the peripheral direction of the light guide member, an arrangement density of the plurality of sawteeth close to the light incident surface is smaller than an arrangement density of the plurality of sawteeth far away from the light incident surface.

13. The camera module according to claim 10, wherein one or more of the following:
in the peripheral direction of the light guide member, a minimum distance between adjacent two of the plurality of sawteeth close to the light incident surface is at a range from 0.05 mm to 0.07 mm; and
in the peripheral direction of the light guide member, a minimum distance between adjacent two of the plurality of sawteeth far away from the light incident surface is at a range from 0.01 mm to 0.03 mm.

14. The camera module according to claim 1, wherein a color temperature of the light source is at a range from 5000 kelvins (K) to 14000 K; and/or, the light source is a light emitting diode; and
wherein a material of the light guide member comprises a light guide substrate and a light diffusing powder distributed in the light guide substrate; a material of the light guide substrate comprises one of a polycarbonate substrate and a polymethylmethacrylate substrate; a mass percentage of the light diffusing powder is at a range from 0% to 0.5%.

15. A mobile terminal, comprising:
a camera module, wherein the camera module comprises: a lens assembly, a light guide member and a light source; the light guide member is sleeved on an outer peripheral side of the lens assembly, and light emitted by the light source is incident in the light guide member through an outer peripheral side of the light guide member and is emitted out through a light emitting surface of the light guide member, and the light emitting surface faces toward an object side of the lens assembly; and
a housing, provided with a light-through opening, wherein the camera module is located in the housing, and the light guide member is arranged at the light-through opening;
wherein the light guide member comprises a light guide body and a light incident part, the light guide body is sleeved on the outer peripheral side of the lens assembly, the light incident part is disposed on an outer peripheral side of the light guide body or on an image side of the light guide body, the light incident part is provided with a light incident surface for the light emitted by the light source to enter, and the light emitting surface is disposed on the light guide body;
wherein an object side end of the lens assembly is disposed in an incidence opening of the light guide member, the camera module further comprises a cover plate disposed on the object side of the lens assembly, the cover plate closes the incidence opening, the cover plate is provided with a viewing area and an annular light shading area surrounding an outer periphery of the viewing area, and a light transmittance of the viewing area is greater than a light transmittance of the annular light shading area; a plane perpendicular to an optical axis of the lens assembly is taken as a projection plane, a projection of a lens in the lens assembly is located in a projection of the viewing area; and wherein an inner peripheral wall surface of the incidence opening is provided with a step surface, and the cover plate is supported on the step surface; and/or, the cover plate and the light guide member are integrally formed; and/or, the camera module further comprises one of a light blocking layer and a reflective layer disposed on the inner peripheral wall surface of the incidence opening.

16. The mobile terminal according to claim 15, wherein the housing comprises a front housing and a rear cover, and an accommodation cavity is defined between the front housing and the rear cover;

wherein the mobile terminal further comprises a main board disposed in the accommodation cavity, a second installation space is defined between the main board and the rear cover, and a surface of the main board close to the second installation space is a third surface;

wherein the camera module is arranged in the second installation space, and an end of the lens assembly close to the main board is in contact with the third surface; or, there is a gap between the end of the lens assembly close to the main board and the third surface;

wherein the lens assembly is a functional camera, and the mobile terminal further comprises a main camera disposed in the second installation space; the main board is provided with an avoidance opening, and an end of the main camera close to the main board is penetrated into the avoidance opening;

wherein the functional camera is capable of imaging when a working distance is within an ultra-micro range, which is at a range from 3 mm to 10 mm; and wherein the mobile terminal further comprises a flexible circuit board, the light source is disposed on the flexible circuit board, and the flexible circuit board is electrically connected with the main board.

17. A camera module, comprising:
a lens assembly;
a light guide member, being of an annular structure, wherein the light guide member is sleeved on an outer peripheral side of the lens assembly; and
a light source, wherein light emitted by the light source is incident in the light guide member through an outer peripheral side of the light guide member and is emitted out through a light emitting surface of the light guide member, and the light emitting surface faces toward an object side of the lens assembly;
wherein the light guide member comprises a light guide body and a light incident part, the light guide body is sleeved on the outer peripheral side of the lens assembly, the light incident part is disposed on an outer peripheral side of the light guide body or on an image side of the light guide body, the light incident part is provided with a light incident surface for the light emitted by the light source to enter, and the light emitting surface is disposed on the light guide body;
wherein a surface of the light guide member facing toward the image side is provided with a scattering structure; the light emitted by the light source is scattered by the scattering structure and then emitted from the light emitting surface to a camera area of the lens assembly; an orthographic projection of the light emitting surface in a direction of an optical axis is located in an area where the scattering structure is located;
wherein the scattering structure comprises a plurality of sawteeth spaced along a peripheral direction of the lens assembly, and the plurality of sawteeth extend along a radial direction of the lens assembly; and
wherein in a peripheral direction of the light guide member, an arrangement density of the plurality of sawteeth close to the light incident surface is smaller than an arrangement density of the plurality of sawteeth far away from the light incident surface.

* * * * *